United States Patent
Allan et al.

(10) Patent No.: US 12,043,575 B2
(45) Date of Patent: Jul. 23, 2024

(54) GLASS LAMINATE WITH BURIED STRESS SPIKES TO ARREST CRACKS AND METHODS OF MAKING THE SAME

(71) Applicant: CORNING INCORPORATED, Corning, NY (US)

(72) Inventors: Douglas Clippinger Allan, Corning, NY (US); Vladislav Yuryevich Golyatin, Avon (FR); Petr Gorelchenko, Elmira, NY (US); Jason Thomas Harris, Horseheads, NY (US); Jin Su Kim, Seoul (KR); Peter Joseph Lezzi, Corning, NY (US); Rostislav Vatchev Roussev, Painted Post, NY (US); Natesan Venkataraman, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/201,303

(22) Filed: May 24, 2023

(65) Prior Publication Data

US 2023/0295038 A1 Sep. 21, 2023

Related U.S. Application Data

(62) Division of application No. 17/632,086, filed as application No. PCT/US2020/044436 on Jul. 31, 2020, now Pat. No. 11,697,617.

(Continued)

(51) Int. Cl.
*C03C 21/00* (2006.01)
*B32B 17/06* (2006.01)
(Continued)

(52) U.S. Cl.
CPC .............. *C03C 27/06* (2013.01); *B32B 17/06* (2013.01); *C03C 21/002* (2013.01); *B32B 2307/558* (2013.01)

(58) Field of Classification Search
None
See application file for complete search history.

(56) References Cited

U.S. PATENT DOCUMENTS

| 1,951,950 A | 3/1934 | Rising |
| 2,106,527 A | 1/1938 | Hostetter |

(Continued)

FOREIGN PATENT DOCUMENTS

| AU | 42657/72 A | 11/1973 |
| AU | 05245/73 B2 | 9/1982 |

(Continued)

OTHER PUBLICATIONS

Hara, Morihisa et al., "Vickers Hardness of Toughened Sheet Glass," Reports of the Research Laboratory, Asahi Glass Co., Ltd., vol. 12, No. 2, 1962, pp. 99-104.

(Continued)

*Primary Examiner* — David Sample
(74) *Attorney, Agent, or Firm* — Daniel J. Greenhalgh

(57) ABSTRACT

A laminated glass article comprises a core layer comprising a core glass composition, and a cladding layer directly adjacent to the core layer and comprising a clad glass composition. A stress of the cladding layer increases with increasing distance from an outer surface of the cladding layer from a compressive stress to a tensile stress, transitions to a compressive stress as a step-change at an interface region between the core layer and the cladding layer, and increases with increasing distance from the interface region to a center of the core layer from the compressive stress to a tensile stress.

8 Claims, 17 Drawing Sheets

Related U.S. Application Data

(60) Provisional application No. 62/883,401, filed on Aug. 6, 2019.

(51) Int. Cl.
  *C03C 27/02* (2006.01)
  *C03C 27/06* (2006.01)

(56) References Cited

U.S. PATENT DOCUMENTS

| | | |
|---|---|---|
| 2,145,119 A | 1/1939 | Littleton |
| 2,177,336 A | 10/1939 | Shaver et al. |
| 3,107,196 A | 10/1963 | Acloque |
| 3,169,900 A | 2/1965 | Ermlich |
| 3,174,839 A | 3/1965 | Long |
| 3,223,499 A | 12/1965 | Cypher et al. |
| 3,223,501 A | 12/1965 | Fredley et al. |
| 3,223,549 A | 12/1965 | Fredley et al. |
| 3,225,349 A | 12/1965 | Thor |
| 3,279,906 A | 10/1966 | Baker |
| 3,287,200 A | 11/1966 | Hess et al. |
| 3,293,015 A | 12/1966 | Fredley et al. |
| 3,332,759 A | 7/1967 | McMaster et al. |
| 3,374,078 A | 3/1968 | Wright |
| 3,409,422 A | 11/1968 | Gulotta |
| 3,423,198 A | 1/1969 | McMaster et al. |
| 3,445,316 A | 5/1969 | Megles |
| 3,449,102 A | 6/1969 | Nedelec et al. |
| 3,497,340 A | 2/1970 | Dennison et al. |
| 3,556,757 A | 1/1971 | Kozlowski et al. |
| 3,558,415 A | 1/1971 | Rieser et al. |
| 3,607,169 A | 9/1971 | Coxe |
| 3,637,453 A | 1/1972 | Simmons |
| 3,673,049 A | 6/1972 | Giffen et al. |
| 3,679,388 A | 7/1972 | Giddings et al. |
| 3,744,921 A | 7/1973 | Weller et al. |
| 3,753,674 A | 8/1973 | Ohlberg et al. |
| 3,776,712 A | 12/1973 | Wilde |
| 3,793,127 A | 2/1974 | Wartenberg |
| 3,794,476 A | 2/1974 | Michalik et al. |
| 3,830,540 A | 8/1974 | Sperry |
| 3,844,758 A | 10/1974 | Wartenberg |
| 3,850,679 A | 11/1974 | Sopko et al. |
| 3,883,339 A | 5/1975 | Michalik et al. |
| 3,890,128 A | 6/1975 | Melling et al. |
| 3,902,884 A | 9/1975 | Harrison |
| 3,929,442 A | 12/1975 | Neely, Jr. |
| 3,931,438 A | 1/1976 | Beall et al. |
| 3,936,291 A | 2/1976 | McMaster |
| 3,973,943 A | 8/1976 | Seymour |
| 3,994,711 A | 11/1976 | McMaster |
| 4,081,254 A | 3/1978 | Matsumoto et al. |
| 4,091,163 A | 5/1978 | Clausen |
| 4,107,460 A | 8/1978 | Grunza et al. |
| 4,128,690 A | 12/1978 | Boardman et al. |
| 4,194,898 A | 3/1980 | Marsh et al. |
| 4,198,226 A | 4/1980 | Marsh et al. |
| 4,198,463 A | 4/1980 | Greenhalgh |
| 4,204,845 A | 5/1980 | Shields et al. |
| 4,214,886 A | 7/1980 | Shay et al. |
| 4,286,052 A | 8/1981 | Ernsberger |
| 4,300,936 A | 11/1981 | Quillevere et al. |
| 4,314,836 A | 2/1982 | Seymour |
| 4,319,907 A | 3/1982 | Pike |
| 4,332,605 A | 6/1982 | Wright et al. |
| 4,372,774 A | 2/1983 | Cross et al. |
| 4,400,193 A | 8/1983 | Cross et al. |
| 4,470,838 A | 9/1984 | McMaster et al. |
| 4,471,024 A | 9/1984 | Pargamin et al. |
| 4,494,972 A | 1/1985 | Marsh et al. |
| 4,516,999 A | 5/1985 | Kiefer et al. |
| 4,662,926 A | 5/1987 | Aratani et al. |
| 4,690,871 A | 9/1987 | Gordon |
| 4,744,676 A | 5/1988 | Lind |
| 4,773,926 A | 9/1988 | Letemps et al. |
| 4,826,525 A | 5/1989 | Chesworth et al. |
| 4,913,720 A | 4/1990 | Gardon et al. |
| 4,973,163 A | 11/1990 | Sakai et al. |
| 4,985,275 A | 1/1991 | Takemura et al. |
| 5,009,694 A | 4/1991 | Nishitani et al. |
| 5,057,375 A | 10/1991 | Gordon |
| 5,071,796 A | 12/1991 | Jones et al. |
| 5,121,329 A | 6/1992 | Crump |
| 5,213,440 A | 5/1993 | Yeh et al. |
| 5,236,488 A | 8/1993 | Vehmas |
| 5,285,517 A | 2/1994 | Wu |
| 5,340,433 A | 8/1994 | Crump |
| 5,500,287 A | 3/1996 | Henderson |
| 5,626,911 A | 5/1997 | Bertin et al. |
| 5,643,649 A | 7/1997 | Hagan et al. |
| 5,654,057 A | 8/1997 | Kitayama et al. |
| 5,676,722 A | 10/1997 | Seidel et al. |
| 5,735,923 A | 4/1998 | Hisaeda |
| 5,795,659 A | 8/1998 | Meelu et al. |
| 5,885,316 A | 3/1999 | Sato et al. |
| 5,931,981 A | 8/1999 | McMaster et al. |
| 5,938,808 A | 8/1999 | McMaster et al. |
| 5,938,810 A | 8/1999 | Vries et al. |
| 5,939,175 A | 8/1999 | Sugiura |
| 5,972,513 A | 10/1999 | Yoshizawa |
| 6,053,011 A | 4/2000 | Lisec |
| 6,079,227 A | 6/2000 | Yoshizawa et al. |
| 6,094,943 A | 8/2000 | Okuda et al. |
| 6,117,283 A | 9/2000 | Chen et al. |
| 6,183,565 B1 | 2/2001 | Granneman et al. |
| 6,200,665 B1 | 3/2001 | Seto |
| 6,295,842 B1 | 10/2001 | McMaster |
| 6,336,775 B1 | 1/2002 | Morita et al. |
| 6,353,283 B1 | 3/2002 | Ghosh et al. |
| 6,370,917 B1 | 4/2002 | Kato et al. |
| 6,412,309 B1 | 7/2002 | Kajii et al. |
| 6,442,017 B1 | 8/2002 | Ewing et al. |
| 6,461,439 B1 | 10/2002 | Granneman et al. |
| 6,472,800 B2 | 10/2002 | Goda et al. |
| 6,598,427 B1 | 7/2003 | Douche et al. |
| 6,613,685 B1 | 9/2003 | Granneman et al. |
| 6,642,017 B2 | 11/2003 | Weiser |
| 6,656,597 B2 | 12/2003 | Takahara |
| 6,713,180 B1 | 3/2004 | Torr et al. |
| 6,722,160 B1 | 4/2004 | Nemugaki et al. |
| 6,770,851 B2 | 8/2004 | Granneman et al. |
| 6,805,749 B2 | 10/2004 | Granneman et al. |
| 6,826,929 B2 | 12/2004 | Boaz |
| 6,877,250 B2 | 4/2005 | Granneman et al. |
| 6,881,485 B2 | 4/2005 | Kato et al. |
| 6,881,931 B2 | 4/2005 | Vehmas et al. |
| 6,977,710 B2 | 12/2005 | Akiyama et al. |
| 7,022,627 B2 | 4/2006 | Granneman et al. |
| 7,048,488 B1 | 5/2006 | Kuznetsov et al. |
| 7,153,798 B2 | 12/2006 | Bordeaux et al. |
| 7,215,262 B2 | 5/2007 | Suzuki et al. |
| 7,261,939 B2 | 8/2007 | Hallett et al. |
| 7,306,848 B2 | 12/2007 | Tominaga et al. |
| 7,312,156 B2 | 12/2007 | Granneman et al. |
| 7,341,968 B2 | 3/2008 | Yoda et al. |
| 7,367,205 B1 | 5/2008 | Boaz |
| 7,410,355 B2 | 8/2008 | Granneman et al. |
| 7,566,673 B2 | 7/2009 | Kawai |
| 7,666,511 B2 | 2/2010 | Ellison et al. |
| 7,694,532 B1 | 4/2010 | Boaz |
| 7,867,932 B2 | 1/2011 | Beall |
| 7,908,885 B2 | 3/2011 | Devitt |
| 8,074,473 B2 | 12/2011 | Nitschke et al. |
| 8,233,433 B2 | 7/2012 | Kalhan |
| 8,234,883 B2 | 8/2012 | Krall et al. |
| 8,289,342 B2 | 10/2012 | Matsumoto |
| 8,415,013 B2 | 4/2013 | Barefoot et al. |
| 8,524,804 B2 | 9/2013 | Kitano et al. |
| 8,585,463 B2 | 11/2013 | Nakae |
| 8,679,599 B2 | 3/2014 | Grzybowski et al. |
| 8,713,967 B2 | 5/2014 | Danielson et al. |
| 8,713,972 B2 | 5/2014 | Lakota et al. |
| 8,728,961 B2 | 5/2014 | Lautenschlaeger et al. |
| 8,759,238 B2 | 6/2014 | Chapman et al. |

(56) References Cited

U.S. PATENT DOCUMENTS

| | | |
|---|---|---|
| 8,765,262 B2 | 7/2014 | Gross |
| 8,769,990 B2 | 7/2014 | Saito et al. |
| 8,776,548 B2 | 7/2014 | Dannoux et al. |
| 8,802,581 B2 | 8/2014 | Dejneka et al. |
| 8,821,999 B2 | 9/2014 | Grzybowski et al. |
| 8,854,623 B2 | 10/2014 | Fontaine et al. |
| 8,916,013 B2 | 12/2014 | Hong et al. |
| 8,946,103 B2 | 2/2015 | Dejneka et al. |
| 8,951,927 B2 | 2/2015 | Dejneka et al. |
| 8,997,521 B2 | 4/2015 | Vehmas et al. |
| 9,003,835 B2 | 4/2015 | Lock |
| 9,039,886 B2 | 5/2015 | Gong et al. |
| 9,073,291 B2 | 7/2015 | Bookbinder et al. |
| 9,137,892 B2 | 9/2015 | Bando et al. |
| 9,145,329 B2 | 9/2015 | Drake et al. |
| 9,156,724 B2 | 10/2015 | Gross |
| 9,296,638 B2 | 3/2016 | Lezzi et al. |
| 9,478,449 B2 | 10/2016 | Vermont et al. |
| 9,522,836 B2 | 12/2016 | Gulati et al. |
| 9,552,836 B2 | 1/2017 | Ramakrishnan et al. |
| 9,586,861 B2 | 3/2017 | Borrelli et al. |
| 9,725,359 B2 | 8/2017 | Weber |
| 9,761,828 B2 | 9/2017 | Dabich et al. |
| 9,776,905 B2 | 10/2017 | Maschmeyer et al. |
| 9,783,448 B2 | 10/2017 | Maschmeyer et al. |
| 9,802,853 B2 | 10/2017 | Maschmeyer et al. |
| 9,957,190 B2 | 5/2018 | Finkeldey et al. |
| 9,975,801 B2 | 5/2018 | Maschmeyer et al. |
| 10,005,691 B2 | 6/2018 | Maschmeyer et al. |
| 10,077,204 B2 | 9/2018 | Maschmeyer et al. |
| 10,150,699 B2 | 12/2018 | Baum et al. |
| 10,173,923 B2 | 1/2019 | Kawamoto et al. |
| 10,195,778 B2 | 2/2019 | Wolf et al. |
| 10,253,550 B1 | 4/2019 | Kim et al. |
| 11,097,974 B2 | 8/2021 | Lezzi et al. |
| 11,697,617 B2 * | 7/2023 | Allan .................. C03C 27/06 428/428 |
| 2001/0007723 A1 | 7/2001 | Tokumoto |
| 2002/0011481 A1 | 1/2002 | Melson et al. |
| 2002/0145213 A1 | 10/2002 | Liu et al. |
| 2003/0037569 A1 | 2/2003 | Arbab et al. |
| 2003/0177790 A1 | 9/2003 | Langsdorf et al. |
| 2004/0107733 A1 | 6/2004 | Yashizawa |
| 2005/0099618 A1 | 5/2005 | Difoggio et al. |
| 2005/0138892 A1 | 6/2005 | Misonou |
| 2005/0266247 A1 | 12/2005 | Yoshizawa |
| 2006/0054774 A1 | 3/2006 | Yassour et al. |
| 2006/0121281 A1 | 6/2006 | Tamai et al. |
| 2006/0179722 A1 | 8/2006 | Spindler |
| 2006/0191292 A1 | 8/2006 | Carlomagno |
| 2006/0219605 A1 | 10/2006 | Devitt |
| 2006/0238100 A1 | 10/2006 | Miyata et al. |
| 2007/0122580 A1 | 5/2007 | Krall et al. |
| 2007/0271957 A1 | 11/2007 | Nakamura et al. |
| 2008/0314403 A1 | 12/2008 | Rebours |
| 2009/0069163 A1 | 3/2009 | Beall |
| 2009/0092472 A1 | 4/2009 | Luo et al. |
| 2009/0220761 A1 | 9/2009 | Dejneka et al. |
| 2010/0035038 A1 | 2/2010 | Barefoot et al. |
| 2010/0084016 A1 | 4/2010 | Aitken et al. |
| 2010/0130251 A1 | 5/2010 | Chu |
| 2010/0162761 A1 | 7/2010 | Carney et al. |
| 2010/0183767 A1 | 7/2010 | Noordam et al. |
| 2010/0279067 A1 | 11/2010 | Sabia et al. |
| 2010/0279068 A1 | 11/2010 | Cook et al. |
| 2010/0300535 A1 | 12/2010 | Aitken et al. |
| 2010/0300536 A1 | 12/2010 | Aitken et al. |
| 2011/0014475 A1 | 1/2011 | Murata |
| 2011/0045961 A1 | 2/2011 | Dejneka et al. |
| 2011/0123832 A1 | 5/2011 | Matsumoto et al. |
| 2011/0123833 A1 | 5/2011 | Endo et al. |
| 2011/0200804 A1 | 8/2011 | Tomamoto et al. |
| 2011/0281093 A1 | 11/2011 | Gulati et al. |
| 2011/0289971 A1 | 12/2011 | Brown et al. |
| 2011/0289972 A1 | 12/2011 | Brown et al. |
| 2012/0052271 A1 | 3/2012 | Gomez et al. |
| 2012/0144867 A1 | 6/2012 | Busch |
| 2012/0145991 A1 | 6/2012 | Nam et al. |
| 2012/0164314 A1 | 6/2012 | Labranche et al. |
| 2012/0194974 A1 | 8/2012 | Weber et al. |
| 2012/0247063 A1 | 10/2012 | Grzybowski et al. |
| 2012/0258250 A1 | 10/2012 | Rodgers |
| 2012/0281279 A1 | 11/2012 | Goto et al. |
| 2012/0291707 A1 | 11/2012 | Granneman |
| 2012/0328843 A1 | 12/2012 | Cleary et al. |
| 2013/0008500 A1 | 1/2013 | Lin et al. |
| 2013/0019639 A1 | 1/2013 | Saito et al. |
| 2013/0047673 A1 | 2/2013 | Lee et al. |
| 2013/0052347 A1 | 2/2013 | Kuznetsov et al. |
| 2013/0059120 A1 | 3/2013 | Shi et al. |
| 2013/0065795 A1 | 3/2013 | Allbritton et al. |
| 2013/0071666 A1 | 3/2013 | Komori et al. |
| 2013/0122284 A1 | 5/2013 | Gross |
| 2013/0122313 A1 | 5/2013 | Gross |
| 2013/0199448 A1 | 8/2013 | Granneman et al. |
| 2013/0255314 A1 | 10/2013 | Allan et al. |
| 2013/0291598 A1 | 11/2013 | Saito et al. |
| 2013/0323444 A1 | 12/2013 | Ehemann et al. |
| 2014/0010992 A1 | 1/2014 | Rendon Granados |
| 2014/0026622 A1 | 1/2014 | Wang |
| 2014/0050912 A1 | 2/2014 | Isono et al. |
| 2014/0053605 A1 | 2/2014 | Mader |
| 2014/0065401 A1 | 3/2014 | Donovan et al. |
| 2014/0106172 A1 | 4/2014 | Dejneka et al. |
| 2014/0113854 A1 | 4/2014 | Ni et al. |
| 2014/0120279 A1 | 5/2014 | Demartino et al. |
| 2014/0141217 A1 | 5/2014 | Gulati et al. |
| 2014/0162000 A1 | 6/2014 | Son et al. |
| 2014/0178663 A1 | 6/2014 | Varshneya et al. |
| 2014/0218867 A1 | 8/2014 | Kim et al. |
| 2014/0230492 A1 | 8/2014 | Murata |
| 2014/0242391 A1 | 8/2014 | Ono et al. |
| 2014/0290310 A1 | 10/2014 | Green |
| 2014/0331716 A1 | 11/2014 | Ahmed et al. |
| 2014/0352355 A1 | 12/2014 | Boudreau et al. |
| 2014/0356605 A1 | 12/2014 | Adib et al. |
| 2014/0370302 A1 | 12/2014 | Amin et al. |
| 2014/0370303 A1 | 12/2014 | Jin et al. |
| 2015/0027169 A1 | 1/2015 | Fredholm |
| 2015/0030827 A1 | 1/2015 | Gomez et al. |
| 2015/0030834 A1 | 1/2015 | Morey et al. |
| 2015/0031752 A1 | 1/2015 | Keil et al. |
| 2015/0037552 A1 | 2/2015 | Mauro |
| 2015/0051061 A1 | 2/2015 | Kiczenski et al. |
| 2015/0052949 A1 | 2/2015 | Bayne et al. |
| 2015/0082834 A1 | 3/2015 | Vehmas et al. |
| 2015/0083200 A1 | 3/2015 | Hickman et al. |
| 2015/0096331 A1 | 4/2015 | Rantala et al. |
| 2015/0158276 A1 | 6/2015 | Thompson et al. |
| 2015/0158757 A1 | 6/2015 | Amma et al. |
| 2015/0166390 A1 | 6/2015 | Cha et al. |
| 2015/0166401 A1 | 6/2015 | Yamamoto |
| 2015/0175469 A1 | 6/2015 | Tabe |
| 2015/0202845 A1 | 7/2015 | Cherekdjian et al. |
| 2015/0218045 A1 | 8/2015 | Balcom et al. |
| 2015/0240038 A1 | 8/2015 | Macedo et al. |
| 2015/0246846 A1 | 9/2015 | Choju et al. |
| 2015/0251353 A1 | 9/2015 | Rodgers et al. |
| 2015/0251377 A1 | 9/2015 | Cleary et al. |
| 2015/0266235 A1 | 9/2015 | Page |
| 2015/0274015 A1 | 10/2015 | Wachinger et al. |
| 2015/0307385 A1 | 10/2015 | Klein et al. |
| 2015/0314571 A1 | 11/2015 | Cites et al. |
| 2015/0329406 A1 | 11/2015 | Kawamoto et al. |
| 2015/0343704 A1 | 12/2015 | Stahl et al. |
| 2015/0368153 A1 | 12/2015 | Pesansky et al. |
| 2016/0002103 A1 | 1/2016 | Wang et al. |
| 2016/0031739 A1 | 2/2016 | Jezzi et al. |
| 2016/0031741 A1 | 2/2016 | Maschmeyer et al. |
| 2016/0031742 A1 | 2/2016 | Maschmeyer et al. |
| 2016/0031743 A1 | 2/2016 | Maschmeyer et al. |
| 2016/0031744 A1 | 2/2016 | Maschmeyer et al. |
| 2016/0031752 A1 | 2/2016 | Maschmeyer et al. |
| 2016/0031753 A1 | 2/2016 | Maschmeyer et al. |

(56) References Cited

U.S. PATENT DOCUMENTS

| | | | |
|---|---|---|---|
| 2016/0082705 A1 | 3/2016 | Fisher et al. |
| 2016/0168023 A1 | 6/2016 | Baum et al. |
| 2016/0194233 A1 | 7/2016 | Van Pelt |
| 2016/0194239 A1 | 7/2016 | Seto |
| 2016/0207819 A1 | 7/2016 | Cleary et al. |
| 2016/0250825 A1 | 9/2016 | Cleary et al. |
| 2016/0250982 A1 | 9/2016 | Fisher et al. |
| 2016/0281233 A1 | 9/2016 | Granneman et al. |
| 2016/0304352 A1 | 10/2016 | Ozyilmaz et al. |
| 2016/0326051 A1 | 11/2016 | Kim |
| 2017/0008377 A1 | 1/2017 | Fisher et al. |
| 2017/0022100 A1 | 1/2017 | Masters et al. |
| 2017/0072613 A2 | 3/2017 | Bracha et al. |
| 2017/0113440 A1 | 4/2017 | Rickerl et al. |
| 2017/0158543 A1 | 6/2017 | Metz et al. |
| 2017/0174564 A1 | 6/2017 | Cleary et al. |
| 2017/0197870 A1 | 7/2017 | Finkeldey et al. |
| 2017/0226007 A1 | 8/2017 | Garner et al. |
| 2017/0233287 A1 | 8/2017 | Li et al. |
| 2017/0361574 A1 | 12/2017 | Kiczenski et al. |
| 2018/0200955 A1 | 7/2018 | Hoelldorfer et al. |
| 2018/0210308 A1 | 7/2018 | Lam et al. |
| 2018/0250748 A1 | 9/2018 | Page |
| 2018/0304588 A1 | 10/2018 | Harris et al. |
| 2019/0022979 A1 | 1/2019 | Uzzato et al. |
| 2019/0030861 A1 | 1/2019 | Bellman et al. |
| 2019/0160787 A1 | 5/2019 | Bartlow et al. |
| 2019/0161402 A1 | 5/2019 | Harris et al. |
| 2019/0227357 A1 | 7/2019 | Williams et al. |
| 2019/0270284 A1 | 9/2019 | Couillard et al. |
| 2019/0391337 A1 | 12/2019 | Sato |
| 2020/0039146 A1 | 2/2020 | Jahnle et al. |
| 2022/0144682 A1 | 5/2022 | McLaren et al. |

FOREIGN PATENT DOCUMENTS

| | | |
|---|---|---|
| AU | 05351/29 B2 | 3/1984 |
| CA | 1148742 A | 6/1983 |
| CA | 1176468 A | 10/1984 |
| CA | 2171323 A1 | 1/1996 |
| CN | 1208266 A | 2/1999 |
| CN | 1501892 A | 6/2004 |
| CN | 1693247 A | 11/2005 |
| CN | 1896020 A | 1/2007 |
| CN | 101312919 A | 11/2008 |
| CN | 101671112 A | 3/2010 |
| CN | 101774751 A | 7/2010 |
| CN | 101801869 A | 8/2010 |
| CN | 102112407 A | 6/2011 |
| CN | 102149649 A | 8/2011 |
| CN | 102503103 A | 6/2012 |
| CN | 102574726 A | 7/2012 |
| CN | 102659305 A | 9/2012 |
| CN | 102863146 A | 1/2013 |
| CN | 103201230 A | 7/2013 |
| CN | 103253857 A | 8/2013 |
| CN | 103319082 A | 9/2013 |
| CN | 103359934 A | 10/2013 |
| CN | 103534216 A | 1/2014 |
| CN | 103781733 A | 5/2014 |
| CN | 103827051 A | 5/2014 |
| CN | 104103385 A | 10/2014 |
| CN | 104144877 A | 11/2014 |
| CN | 104211288 A | 12/2014 |
| CN | 104260569 A | 1/2015 |
| CN | 104295448 A | 1/2015 |
| CN | 104310773 A | 1/2015 |
| CN | 104355530 A | 2/2015 |
| CN | 104364213 A | 2/2015 |
| CN | 104379532 A | 2/2015 |
| CN | 104428262 A | 3/2015 |
| CN | 104479282 A | 4/2015 |
| CN | 104520249 A | 4/2015 |
| CN | 104541233 A | 4/2015 |
| CN | 104583141 A | 4/2015 |
| CN | 104619622 A | 5/2015 |
| CN | 104619662 A | 5/2015 |
| CN | 104781201 A | 7/2015 |
| CN | 105271762 A | 1/2016 |
| CN | 205275454 U | 6/2016 |
| CN | 105980147 A | 9/2016 |
| CN | 106045283 A | 10/2016 |
| CN | 206970472 U | 2/2018 |
| DE | 2233057 A1 | 3/1973 |
| EP | 0173418 A2 | 3/1986 |
| EP | 0413254 A1 | 2/1991 |
| EP | 0426363 A2 | 5/1991 |
| EP | 0441804 A1 | 8/1991 |
| EP | 0882681 A1 | 12/1998 |
| EP | 1215039 A2 | 6/2002 |
| EP | 1245545 A1 | 10/2002 |
| EP | 1380550 A1 | 1/2004 |
| EP | 1414762 A1 | 5/2004 |
| EP | 1533282 A1 | 5/2005 |
| EP | 1925952 A1 | 5/2008 |
| EP | 2543644 A2 | 1/2013 |
| EP | 2782753 A1 | 10/2014 |
| EP | 2819965 A2 | 1/2015 |
| EP | 2853517 A1 | 4/2015 |
| EP | 2876092 A1 | 5/2015 |
| FR | 2326386 A1 | 4/1977 |
| FR | 2936794 A1 | 4/2010 |
| GB | 0996423 A | 6/1965 |
| GB | 1026770 A | 4/1966 |
| GB | 1103192 A | 2/1968 |
| GB | 1112781 A | 5/1968 |
| GB | 1160284 A | 8/1969 |
| GB | 1253681 A | 11/1971 |
| GB | 1282720 A | 7/1972 |
| GB | 1289488 A | 9/1972 |
| GB | 2232978 A | 1/1991 |
| IN | 202420 | 5/2005 |
| IN | 200803022 | 8/2008 |
| IN | 201404365 | 2/2015 |
| IN | 201407444 | 4/2015 |
| JP | 51-103920 A | 9/1976 |
| JP | 55-104935 A | 8/1980 |
| JP | 56-155030 A | 12/1981 |
| JP | 56-155031 A | 12/1981 |
| JP | 57-067035 A | 4/1982 |
| JP | 57-067036 A | 4/1982 |
| JP | 58-088132 A | 5/1983 |
| JP | 58-091042 A | 5/1983 |
| JP | 59-008626 A | 1/1984 |
| JP | 59-008627 A | 1/1984 |
| JP | 59-008628 A | 1/1984 |
| JP | 59-008629 A | 1/1984 |
| JP | 59-008630 A | 1/1984 |
| JP | 59-008631 A | 1/1984 |
| JP | 59-057923 A | 4/1984 |
| JP | 60-171245 A | 9/1985 |
| JP | 61-072637 A | 4/1986 |
| JP | 61-141756 | 6/1986 |
| JP | 62-036030 A | 2/1987 |
| JP | 63-270330 A | 11/1988 |
| JP | 02-102436 A | 4/1990 |
| JP | 02-175624 A | 7/1990 |
| JP | 03-045526 A | 2/1991 |
| JP | 03-271127 A | 12/1991 |
| JP | 05-098626 A | 4/1993 |
| JP | 05-098627 A | 4/1993 |
| JP | 05-098628 A | 4/1993 |
| JP | 05-098629 A | 4/1993 |
| JP | 05-098630 A | 4/1993 |
| JP | 05-098631 A | 4/1993 |
| JP | 05-330835 A | 12/1993 |
| JP | 06-236030 A | 8/1994 |
| JP | 06-336533 A | 12/1994 |
| JP | 07-089739 A | 4/1995 |
| JP | 07-809739 A | 4/1995 |
| JP | 07-157322 A | 6/1995 |
| JP | 07-267664 A | 10/1995 |
| JP | 09-278468 A | 10/1997 |
| JP | 09-301732 A | 11/1997 |

(56) References Cited

FOREIGN PATENT DOCUMENTS

| | | |
|---|---|---|
| JP | 11-199257 A | 7/1999 |
| JP | 11-310430 A | 11/1999 |
| JP | 2000-072463 A | 3/2000 |
| JP | 2000-103632 A | 4/2000 |
| JP | 2000-172202 A | 6/2000 |
| JP | 2000-327355 A | 11/2000 |
| JP | 2001-002434 A | 1/2001 |
| JP | 2001-180967 A | 7/2001 |
| JP | 2001-307662 A | 11/2001 |
| JP | 2001-348245 A | 12/2001 |
| JP | 2003-040635 A | 2/2003 |
| JP | 2003-137603 A | 5/2003 |
| JP | 2003-261344 A | 9/2003 |
| JP | 2003-321255 A | 11/2003 |
| JP | 2003-342030 A | 12/2003 |
| JP | 2004-091311 A | 3/2004 |
| JP | 2004-115358 A | 4/2004 |
| JP | 3804115 B2 | 8/2006 |
| JP | 2006-298691 A | 11/2006 |
| JP | 2007-191319 A | 8/2007 |
| JP | 2007-261850 A | 10/2007 |
| JP | 2008-282863 A | 11/2008 |
| JP | 4397196 B2 | 1/2010 |
| JP | 4438126 B2 | 3/2010 |
| JP | 4557606 B2 | 10/2010 |
| JP | 4642107 B2 | 3/2011 |
| JP | 4722371 B2 | 7/2011 |
| JP | 4951838 B2 | 6/2012 |
| JP | 2012-232882 A | 11/2012 |
| JP | 2013-177253 A | 9/2013 |
| JP | 5334005 B2 | 11/2013 |
| JP | 2014-001121 A | 1/2014 |
| JP | 2014-073952 A | 4/2014 |
| JP | 2014-521586 A | 8/2014 |
| JP | 2014-166938 A | 9/2014 |
| JP | 2014-523389 A | 9/2014 |
| JP | 5614607 B2 | 10/2014 |
| JP | 5622069 B2 | 11/2014 |
| JP | 2015-006650 A | 1/2015 |
| JP | 2015-034123 A | 2/2015 |
| JP | 2015-054790 A | 3/2015 |
| JP | 2015-061808 A | 4/2015 |
| JP | 2015-086080 A | 5/2015 |
| JP | 5714701 B2 | 5/2015 |
| JP | 2015-112929 A | 6/2015 |
| JP | 2015-151329 A | 8/2015 |
| JP | 2015-163574 A | 9/2015 |
| KR | 10-0218143 B1 | 9/1999 |
| KR | 10-2002-0061567 A | 7/2002 |
| KR | 10-0690381 B1 | 3/2007 |
| KR | 10-0909835 B1 | 7/2009 |
| KR | 10-0918577 B1 | 9/2009 |
| KR | 10-0937889 B1 | 1/2010 |
| KR | 10-1000677 B1 | 12/2010 |
| KR | 10-1032825 B1 | 5/2011 |
| KR | 10-2011-0087774 A | 8/2011 |
| KR | 10-2011-0106629 A | 9/2011 |
| KR | 10-2011-0112503 A | 10/2011 |
| KR | 10-1093947 B1 | 12/2011 |
| KR | 10-1120262 B1 | 3/2012 |
| KR | 10-2012-0051220 A | 5/2012 |
| KR | 10-2012-0070450 A | 6/2012 |
| KR | 10-2013-0024484 A | 3/2013 |
| KR | 10-1248380 B1 | 3/2013 |
| KR | 10-1286131 B1 | 7/2013 |
| KR | 10-1413626 B1 | 8/2014 |
| KR | 2014-0095564 A | 8/2014 |
| KR | 10-2014-0110364 A | 9/2014 |
| KR | 10-2014-0135846 A | 11/2014 |
| KR | 2015-0002816 A | 1/2015 |
| KR | 2015-0013166 A | 2/2015 |
| KR | 10-2015-0051166 A | 5/2015 |
| KR | 10-2015-0129302 A | 11/2015 |
| KR | 10-2015-0129703 A | 11/2015 |
| KR | 2015-0129703 A | 11/2015 |
| RU | 2151750 C1 | 6/2000 |
| RU | 2199496 C2 | 2/2003 |
| RU | 2237621 C1 | 10/2004 |
| RU | 2299184 C1 | 5/2007 |
| RU | 2464243 C1 | 10/2012 |
| SU | 95854 A1 | 11/1952 |
| SU | 443845 A1 | 9/1974 |
| SU | 537960 A1 | 12/1976 |
| SU | 631464 A1 | 11/1978 |
| SU | 556593 A1 | 8/1982 |
| SU | 548188 A1 | 9/1982 |
| SU | 1098916 A1 | 6/1984 |
| SU | 1150234 A1 | 4/1985 |
| SU | 1655920 A1 | 6/1991 |
| SU | 254731 A1 | 3/2013 |
| TW | 201111317 A | 4/2011 |
| TW | 201119967 A | 6/2011 |
| TW | 1393686 B | 4/2013 |
| TW | 201343590 A | 11/2013 |
| TW | 201343591 A | 11/2013 |
| TW | 201418174 A | 5/2014 |
| TW | 201509858 A | 3/2015 |
| TW | 201609589 A | 3/2016 |
| TW | 201623168 A | 7/2016 |
| WO | 90/03337 A1 | 4/1990 |
| WO | 99/44952 A1 | 9/1999 |
| WO | 01/16040 A1 | 3/2001 |
| WO | 01/34531 A1 | 5/2001 |
| WO | 02/16277 A1 | 2/2002 |
| WO | 03/14035 A1 | 2/2003 |
| WO | 2006/083902 A1 | 8/2006 |
| WO | 2006/110145 A1 | 10/2006 |
| WO | 2008/020509 A1 | 2/2008 |
| WO | 2008/143999 A1 | 11/2008 |
| WO | 2008/147558 A1 | 12/2008 |
| WO | 2010/076903 A1 | 7/2010 |
| WO | 2011/122678 A1 | 10/2011 |
| WO | 2012/082709 A1 | 6/2012 |
| WO | 2012/125857 A1 | 9/2012 |
| WO | 2012/142629 A1 | 10/2012 |
| WO | 2013/001841 A1 | 1/2013 |
| WO | 2013/016157 A1 | 1/2013 |
| WO | 2013/078039 A1 | 5/2013 |
| WO | 2013/130665 A2 | 9/2013 |
| WO | 2013/130700 A1 | 9/2013 |
| WO | 2014/024583 A1 | 2/2014 |
| WO | 2014/030682 A1 | 2/2014 |
| WO | 2014/060108 A2 | 4/2014 |
| WO | 2014/139147 A1 | 9/2014 |
| WO | 2014/182641 A1 | 11/2014 |
| WO | 2014/182776 A1 | 11/2014 |
| WO | 2014/201315 A1 | 12/2014 |
| WO | 2015/031148 A1 | 3/2015 |
| WO | 2015/031594 A2 | 3/2015 |
| WO | 2015/033562 A1 | 3/2015 |
| WO | 2015/057552 A2 | 4/2015 |
| WO | 2015/088010 A1 | 6/2015 |
| WO | 2015/125584 A1 | 8/2015 |
| WO | 2015/156262 A1 | 10/2015 |
| WO | 2016/019171 A1 | 2/2016 |
| WO | 2016/037793 A1 | 3/2016 |
| WO | 2016/057590 A1 | 4/2016 |
| WO | 2016/094262 A1 | 6/2016 |
| WO | 2016/183059 A1 | 11/2016 |
| WO | 2017/019837 A1 | 2/2017 |
| WO | 2017/020041 A1 | 2/2017 |
| WO | 2017/066243 A1 | 4/2017 |
| WO | 2017/071911 A1 | 5/2017 |
| WO | 2017/079540 A1 | 5/2017 |
| WO | 2017/139552 A1 | 8/2017 |
| WO | 2018/136384 A1 | 7/2018 |
| WO | 2018/136388 A1 | 7/2018 |

(56) References Cited

FOREIGN PATENT DOCUMENTS

| WO | WO-2018136384 A1 * | 7/2018 | ............. B32B 17/06 |
|---|---|---|---|
| WO | 2021/025981 A1 | 2/2021 | |

OTHER PUBLICATIONS

Hibino, Yoshinori et al., "Raman study on silica optical fibers subjected to high tensile stress," Applied Physics Letters, vol. 47, No. 8, Oct. 15, 1985, pp. 812-814.

Hodge, Ian M., "Physical Aging in Polymer Glasses," Science, vol. 267, , No. 5206, Mar. 31, 1995, pp. 1945-1947.

Hrma et al; "Thermal Healing of Cracks in Glass"; Journal of Non-Crystalline Solids; vol. 102, (1988); pp. 88-94.

Huang, Liping et al., "Polymorphic transitions in vitreous B203 under pressure," Journal of Physics: Condensed Matter, vol. 20, 2008, 8 pages.

Hubert, Mathieu, "Lecture 9: Annealing and tempering," IMI-NFG Course on Processing in Glass—Lecture 9, Feb. 19, 2015, 72 slides.

Hutchins, J. and R. Harrington, "Glass", Kirk-Othmer Encyclopedia of Chemical Technology, 2nd Edition, vol. 10, 1966, pp. 533-604.

Ito, Setsuro, "Brittleness and Nano-Structure of Glass," 4th International Workshop on Flow and Fracture of Advanced Glasses Presentation, Nov. 5-7, 2007, Shiga, Japan, 37 slides.

Jain, Himanshu, "Electrical Relaxation—Topic 1: Quasi-free ion transport," IMI-NFG's MITI Course on Relaxation Processes in Glass Lecture 23, Advanced Vitreous State, The Properties of Glass: Dielectric Properties—Lecture 1, 2010, 28 slides.

Jain, Himanshu, "Electrical Relaxation—Topic 3: Nearly constant loss—second universality," IMI-NFG's Min Course on Relaxation Processes in Glass Lecture 25, Advanced Vitreous State, The Properties of Glass: Dielectric Properties—Lecture 3, 2010, 24 slides.

Jain, Himanshu, "Electrical Relaxation—Topic 2: Universal dielectric response (UDR)," IMI-NFG's MITT Course on Relaxation Processes in Glass Lecture 24, Advanced Vitreous State, The Properties of Glass: Dielectric Properties-Lecture 1, 2010, 22 slides.

John Klein et al: "Additive Manufacturing of optically Transparent Glass", 3D Printing and Additive Manufactureing, vol. 2, No. 3, Aug. 19, 2015 (Aug. 19, 2015), pp. 92-105, XP055328426.

Karlsson, Stefan et al., "The technology of chemical glass strengthening—a review," Glass Technology, European Journal of Glass Science Technology Part A, vol. 51, No. 2, Apr. 2010, pp. 41-54.

Kassir-Bodon, Assia et al., "Raman Mapping of the Indentation-Induced Densification of a Soda-Lime-Silicate Glass," International Journal of Applied Glass Science, vol. 3, No. 1, 2012, pp. 29-35.

Kiefer, Werner et al., "Method for Thermal Prestressing of Glass," Strength of Inorganic Glass, Plenum Press, New York, 1985, pp. 501-511.

Kishii, Toru, "Surface Stress Meters Utilising the Optical Waveguide Effect of Chemically Tempered Glasses," Optics and Lasers in Engineering, vol. 4, 1983, pp. 25-38.

Kistler, S. S., "Stresses in Glass Produced by Nonuniform Exchange of Monovalent Ions," Journal of the American Ceramic Society, vol. 45, No. 2, Feb. 1962, pp. 59-68.

Koike et al.—Sub-critical crack growth rate of soda-lime-silicate glass and less brittle glass as a function of fictive temperature; Journal of Non-Crystalline Solids vol. 353 Issue 27 pp. 2675-2680; Jun. 2007 (Year: 2007).

Koike, A. et al., "Fictive temperature dependence of subcritical crack growth rate of normal glass and anomalous glass," Journal of Non-Crystalline Solids, vol. 352, 2006, pp. 5522-5530.

Kong, Jinhak et al., "Residual Stress Analysis with Improved Numerical Methods for Tempered Plate Glasses Based on Structural Relaxation Model," Metals and Materials International, vol. 13, No. 1, 2007, pp. 67-75.

Lathabai, Srinivasarao et al., "Fracture mechanics model for subthreshold indentation flaws: Part 1—Equilibrium fracture," Journal of Materials Science, vol. 26, 1991, pp. 2157-2168.

Lee, Hoikwan et al., "Glass Thickness and Fragmentation Behavior in Stressed Glasses," New Journal of Glass and Ceramics, vol. 2, 2012, pp. 138-143.

Lezzi, P. J. et al., "Confirmation of thin surface residual compressive stress in silica glass fiber by FTIR reflection spectroscopy," Journal of Non-Crystalline Solids, vol. 390, 2014, pp. 13-18.

Li, Hong et al., "Effect of Fictive Temperature on Dynamic Fatigue Behavior of Silica and Soda-Lime Glasses," Journal of the American Ceramic Society, vol. 78, No. 5, 1995, pp. 1393-1396.

Lin et al., "Graphene annealing: how clean can it be?", Nano Lett., vol. 12, Issue 1, 2012, pp. 414-419.

Loucks, "Lecture 13: The Fictive and Glass Transition Temperatures," IMI-NFG's Min Course on Relaxation Processes in Glass Lecture 13, Mar. 2, 2010, 25 Slides.

Loucks, "Lecture 14: Relaxation and the Tool-Narayanaswamy-Moynihan Equation," IMI-NFG's MITT Course on Relaxation Processes in Glass Lecture 14, Mar. 4, 2010, 27 Slides.

Loucks, "Lecture 15: The Tool-Narayanaswamy-Moynihan Equation Part II and DSC," IMI-NFG's MITT Course on Relaxation Processes in Glass Lecture 15, Mar. 9, 2010, 33 Slides.

Loucks, Dr. Roger, "Lecture 16: The Tool-Narayanaswamy-Moynihan Equation Part II and DSC," IMI-NFG's MITT Course on Relaxation Processes in Glass Lecture 16, Mar. 11, 2010, 32 slides.

Luo et al., "Competing Indentation Deformation Mechanisms in Glass Using Different Strengthening Methods", Frontiers in Materials, vol. 3, No. 52, 2016, 11 pages.

Luo et al; "Additive Manufacturing of Glass for Optical Applications"; Proc. of Spie, vol. 9738, 2016; pp. 97380Y-1-97380Y-9.

Markovsky, Alex et al., "An Efficient and Stable Algorithm for Calculating Fictive Temperatures," Communications of the American Ceramic Society, Apr. 1984, 2 pages.

Martin, Dr. Steve, "Lecture 10: Thermodynamic Functions," IMI-NFG's MITT Course on Relaxation Processes in Glass Lecture 10, 2010, 25 slides.

Martin, Dr. Steve, "Lecture 11: Thermodynamics in the Glass Transition Region," IMI-NFG's MITT Course on Relaxation Processes in Glass Lecture 11, 2010, 22 slides.

Martin, Dr. Steve, "Lecture 12: The Glass Transition as a Kinetic Transition," IMI-NFG's Min Course on Relaxation Processes in Glass Lecture 12, 2010, 21 slides.

Martin, Dr. Steve, "Lecture 9: Thermodynamic Concepts and the Law of Thermodynamics," IMI-NFG's Min Course on Relaxation Processes in Glass Lecture 9, 2010, 32 slides.

Massen, Claire P. et al., "Power-law distributions for the areas of the basins of attraction on a potential energy landscape," Physical Review E, The American Physical Society, vol. 75, 2007, 4 pages.

Mauricio-Iglesias, M. et al., "Raman depth-profiling characterization of a migrant diffusion in a polymer," Journal of Membrane Science, vol. 375, 2011, pp. 165-171.

McGlinchy, Timothy B., "Energy Efficient Tripe IG Automation EEE (Triple-E), " DE-EE0000167, GED Integrated Solutions, Feb. 28, 2013, 45 pages.

McMaster, Ronald A. et al., "Annealed and Tempered Glass," Engineered Materials Handbook, vol. 4, Ceramics and Glasses, 1991, 9 pages.

McMaster, Ronald A., "Flat Glass Tempering—How II Works," Glass Industry, Jun. 1989, pp. 10-15.

McMaster, Ronald A., "Fundamentals of Tempered Glass," Proceedings of the 49th Conference on Glass Problems: Ceramic Engineering and Science Proceedings, vol. 10, Issue 3/4, 1989, pp. 193-206.

Merriam-Webster Online Dictionary, "Coextensive" , 2009, 1 page. Retrieved from: https://www.merriam-webster.com/dictionary/coextensive.

Mikowski, A. et al., "Statistical analysis of threshold load for radial crack nucleation by Vickers indentation in commercial soda-lime silica glass," Journal of Non-Crystalline Solids, vol. 352, 2006, pp. 3544-3549.

Mognato, Ennio et al., "Thermally toughened safety glass," Glass on Web, Last Reviewed: Jul. 2011, 9 pages, http://www.glassonweb.com/articles/article/727/.

(56) References Cited

OTHER PUBLICATIONS

Morey; "The Effect of Boric Oxide on the Devitrification of the Soda-Lime-Silica Glasses. the Quaternary System, Na2O-CaO-B2O3-SiO2"; Journal of the Amercian Ceramic Society; vol. 15, Issue 9; pp. 457-475 (1932).

Moynihan, C. T. et al., "Structural Relaxation in Vitreous Materials," Annals of the New York Academic of Sciences, vol. 279, Oct. 1976, pp. 15-35.

Narayanaswamy, O. S et al., "Calculation of Residual Stresses in Glass," Journal of the American Ceramic Society, vol. 52, No. 10, Oct. 1969, pp. 554-558.

Narayanaswamy, O. S., "Stress and Structural Relaxation in Tempering Glass," Journal of the American Ceramic Society, vol. 61, No. 3-4, Mar.-Apr. 1978, pp. 146-152.

Oakley, David R., "Crack branching in float glass subjected to biaxial loading," Journal of Non-Crystalline Solids, vol. 196, 1996, pp. 139-143.

Ohlberg, S.M. et al., "Thermal Stress Calculations Based on a Linear Viscoelastic Deviatoric Response and a Fictive Temperature Component for the Volumetric Response," Journal of Non-Crystalline Solids, vol. 14, 1974, pp. 280-286.

Paschel, Richard, "History of the Safety Glazing Certification Council," Safety Glazing Certification Council, 1971, 11 pages.

Properties of Soda-Lime Silica Float Glass Technical Bulletin; NSG; Group; Pilkington North America, Inc. Jan. 14, 2013 (Year: 2013).

Ray, N. H. et al., "Increasing the strength of glass by treatment in molten salts," Physics and Chemistry of Glasses, vol. 8, No. 1, Feb. 1967, pp. 30-34.

Rekhson, S. M., "Chapter 1: Viscoelasticity of Glass," In "Glass: Science and Technology," vol. 3, 1986, 117 pages.

Rekson, S. M., "Structural Relaxation and Shear Stresses in the Glass-Transition Region," Soviet Journal of Glass Physics and Chemistry, 1975, pp. 417-421.

Sastry, Srikanth, "The relationship between fragility, configurational entropy and the potential energy landscape of glass-forming liquids," Nature, vol. 409, Jan. 11, 2001, pp. 164-167.

Scherer, George W., "Use of the Adam-Gibbs Equation in the Analysis of Structural Relaxation," Journal of the American Ceramic Society, vol. 67, No. 7, Jul. 1984, pp. 504-511.

Sciortino, Francesco, "Potential energy landscape description of supercooled liquids and glasses," Journal of Statistical Mechanics: Theory and Experiment, May 31, 2005, 35 pages.

Sehgal, Jeetendra et al., "A New Low-Biillleness Glass in the Soda-Lime-Silica Glass Family," Journal of the American Ceramic Society, vol. 81, No. 9, Sep. 1998, pp. 2485-2488.

Sehgal, Jeetendra et al., "A New Low-Brittleness Glass in the Soda-Lime-Silica Glass Family," Journal of the American Ceramic Society, vol. 81, No. 9, Sep. 1998, pp. 2485-2488.

Setsuro, Ito et al., "Processing Technical Books to the Glass High-Functions," Chapter 3: Sections 2.5, 3, 3.1, 3.2 & 3.3, Science & Technology Co., Ltd., Sep. 27, 2012, pp. 58-65.

Sglavo, V., A. Prezzi, M. Alessandrini, "Processing of Glasses with Engineered Stress Profiles," Journal of Non-Crystalline Solids, 344 (2004), 73-78.

Shelby "Introduction to Glass Science and Technology"; The Royal Chemical Society, 2nd Edition, 2005; p. 193.

Shimodaira, N. et al., "Raman spectra of fluorine-doped silica glasses with various fictive temperatures," Journal of Applied Physics, vol. 91, No. 6, Mar. 15, 2002, pp. 3522-3525.

Shinkai, Norihiko et al., "Indentation Fracture of Tempered Glasses," Reports of the Research Laboratory, Asahi Glass Co., Ltd., vol. 23, No. 2, 1973, pp. 83-99.

Shouyuan, Zhai et al., "Influence of Temperature and Time on Glass Strength During Chemical Tempering, " [8] Journal of Shangdong Institute of Light Industry (Natural Science Edition), Feb. 1996, 3 pages.

Shutov, A. I. et al., "Prediction of the Character of Tempered Glass Fracture," Glass and Ceramics, vol. 55, Nos. 1-2, 1998, pp. 8-10.

Soules, Thomas F. et al., "Finite-Element Calculation of Stresses in Glass Parts Undergoing Viscous Relaxation," Journal of the American Ceramic Society, vol. 70, No. 2, Feb. 1987, pp. 90-95.

Southard, J. C., "The Thermal Properties of Crystalline and Glassy Boron Trioxide," Journal of the American Chemical Society, vol. 63, No. 11, Nov. 1941, pp. 3147-3150.

Spaght, Monroe E. et al., "Studies on Glass. VIII. The Coefficient of Thermal Expansion of Boron Trioxide," Journal of Physical Chemistry, vol. 38, No. 1, 1934, pp. 103-110.

Specialty Glass Products, "Soda Lime/AR/Flint Glass"; http://www.sgpinc.com/sodalime.htm accessed Aug. 11, 2016.

Stillinger, Frank H. et al., "Packing Structures and Transitions in Liquids and Solids," Science, New Series, vol. 225, No. 4666, Sep. 7, 1984, pp. 983-989.

Stillinger, Frank H., "A Topographic View of Supercooled Liquids and Glass Formation," Science, New Series, vol. 267, No. 5206, Mar. 31, 1995, pp. 1935-1939.

Tailant, D. R. et al., "The Effects of Tensile Stress on the Raman Spectrum of the Silica Glass," Journal of Non-Crystalline Solids, vol. 106, 1988, pp. 380-383.

Tandon, Rajan et al., "Controlling the Fragmentation Behavior of Stressed Glass," Fracture Mechanics of Ceramics, vol. 14, 2005, p. 77.

Timoshenko et al; "Theory of Elasticity"; 2nd Ed; p. 146. McGraw-Hill Book Co., New York, 1951.

To, Q.D., et al., "Failure analysis of tempered glass structures with pin-loaded joints," Engineering Failure Analysis, vol. 14, Issue 5, Jul. 2007, pp. 841-850.

Tomlinson, R., G. Calvert, and A. Conway, "A Photoelastic Investigation Into Spontaneous Glass Fracture", Proceedings of the XIth International Congress and Exposition, (Jun. 2008) 8 pgs.

Varughese, Binoy et al., "Effect of Active temperature on mechanical strength of soda-lime glasses," Journal of Non-Crystalline Solids, vol. 241, 1998, pp. 134-139.

Walrafen, G. E. et al., "Raman investigation of optical fibers under high tensile stress," Journal of Applied Physics, vol. 52, No. 4, Apr. 1981, pp. 2832-2836.

Wang et al; "Glass and Hot Extrusion by Me Module for 3D Additive Manufacturing" ; IEEE, 2016; pp. 1167-1171.

Wang, Fei et al., "Pressure Raman effects and internal stress in network glasses," Physical Review B, vol. 71, 2005, 32 pages.

Weissmann, Rand D. Durkop, "A Novel Method for Measuring Stresses in Flat Glass", XV International Congress on Glass Leningrad 1989, Proceeding 3b, O. V. Mazurin, ed., pp. 217-220.

Yamane, Masayuki, "Chapter 3: Thermal Processing," Glass Engineering Handbook, Asakura Publishing Co. Ltd., Jul. 1999, pp. 410-417.

Young Modulus of the elements; Wolfram Research Inc.; http://periodictable.com/Properties/A/YoungModulus.v.html; printed Mar. 7, 2019 (Year: 2019).

Yue, Y.Z. et al., "Determination of the fictive temperature for a hyperquenched glass," Chemical Physics Letters, vol. 357, Issues 1-2, May 3, 2002, pp. 20-24.

Zaccaria et al; "Thermal Healing of Realistic Flaws in Glass"; J. Mater. Civ. Eng 2016, 28(2); pp. 04015127-1-04015127-9.

Zaman, F. D. et al., "Cooling of a Plate with General Boundary Conditions," International Journal of Mathematics and Mathematical Sciences, vol. 23, No. 7, 2000, pp. 477-485.

Zhi-Hai, L., "Development status and trend of tempered glass," Glass, Apr. 30, 2004, pp. 49-52 (Orignal Document Only ).

"Effects of ion exchange on the Young's modulus of glass"; John D. Mackenzie, J. Wakaki; Journal of Non-crystalline Solids; vols. 38-39, Part 1 May-Jun. 1980, pp. 385-390 (Year: 1980).

"Energy Curable Resins", https://www.allnex.com/en/technologies/energy-curable-resins; retrieved on Oct. 10, 2022.

Aben, H. et al., "2.7 Stresses Due to Heterogeneities," Photoelasticity of Glass, Springer-Verlag, New York, 1993, 260 pages.

Acloque, P., "Influence of Strain-Systems in Glass upon the Course of its Fracture," Proceedings of the 4th International Glass Congress, vol. 6, 1965, pp. 279-291.

(56) References Cited

OTHER PUBLICATIONS

Acloque, Paul, "Comparison Between Heat-Transfer Conditions and Setting Up of Strain in Glass During Heat-Treatment," Journal of the American Ceramic Society, vol. 44, No. 7, Jul. 1961, pp. 364-373.
Agarwal, Anand et al., "A simple IR spectroscopic method for determining fictive temperature of silica glasses," Journal of Non-Crystalline Solids, vol. 185, 1995, pp. 191-198.
Agarwal, Anand et al., "Determination of Fictive Temperature of Soda-Lime Silicate Glass," Journal of the American Ceramic Society, vol. 78, No. 3, Mar. 1995, pp. 827-829.
Akeyoshi, K. et al., "Mechanical Properties of Tempered Glass," Proceedings of the 7th International Glass Congress, vol. 14, 1965, pp. 80-85.
Alexiades, V. et al., "The New Way/Glaston Problem," 28th Annual Workshop on Mathematical Problems in Industry, University of Delaware, Jun. 2012, 30 slides.
Argon, A. S., "Chapter 3: Inelastic Deformation and Fracture in Oxide, Metallic, and Polymeric Glasses," In, "Glass: Science and Technology," vol. 5, Elasticity and Strength in Glass, Academic Press, May 28, 1980, pp. 79-132.
Aronen, Antti et al., "Tempering of Thin Glass," Glasstec 2012: Engineered Transparency, Oct. 25-26, 2012, pp. 145-153.
ASTM C1499-09, "Standard Test Method for Monotonic Equibiaxial Flexural Strength of Advanced Ceramics at Ambient Temperature", 2013, 14 pages.
ASTM C158-02, "Standard Test Methods for Strength of Glass by Flexure" (Determination of Modulus of Rupture), 2012, 9 pages.
Author Unknown, "Application Note AN 527: Depth profiling of complex samples using confocal Raman microscopy," Bruker Optics Inc., 2012, 3 pages.
Author Unknown, "Architectural ERH2 ," Architectural Glass Systems, Glasstech, Inc., 2011, 2 pages.
Author Unknown, "Architectural FCH2(Trademark) , "Architectural Glass Systems, Glasstech, Inc., 2011, 2 pages.
Author Unknown, "Coming(Registered) Gorilla(Trademark) Glass," Corning Incorporated, 2009, 2 pages.
Author Unknown, "Glass Strengthening Methods, "Abrisa Technologies, Apr. 2015, 2 pages.
Author Unknown, "Heat Treated Glass for Architectural Glazing," Glass Technical Document: TD-138, PPG Glass Technology, PPG Industries, Inc., Nov. 2011, 8 pages.
Author Unknown, "Introducing—Glasstech CRB-S.TM. 1900 for Solar Parabolic Shapes," Solar Glass Systems, Glasstech, Inc., Date Unknown, 1 page, Retrieved Jul. 1, 2015.
Author Unknown, "New Way Air Bearings," 28th Annual Workshop on Mathematical Problems in Industry, University of Delaware, Jun. 2012, 16 slides.
Author Unknown, "Products, Glazing Techniques and Maintenance Section 4: GGF Dalasheet for the Quality of Thermally Toughened Soda Lime Silicate Safety Glass for Building," Glass and Glazing Federation, Aug. 2009, 12 pages.
Author Unknown, "Schott Technical Glasses—Physical and technical properties," Schott North America, Inc., Feb. 2010, 44 pages.
Author Unknown, "scratch and dig numbers," Sizes, Inc., Last Revised: Jun. 24, 2010, 5 pages, http:/fwww.sizes.com/units/scratch_and_dig.him.
Author Unknown, "Solar FCH-S(Trademark) , "Solar Glass Systems, Glasstech, Inc., 2011, 2 pages.
Author Unknown, "Standard Specification for Heat-Strengthened and Fully Tempered Flat Glass," Designation: C 1048-12, ASTM International Standard, 2015, 7 pages.
Author Unknown, "Standard Specification for Heat-Treated Flat Glass—Kind HS, Kind FT Coated and Uncoated Glass," Designation: C 1048-4, ASTM International Standard, 2009, 7 pages.
Author Unknown, "Subject Index," Date Unknown, pp. 277-282. Retrieved Apr. 24, 2015.
Author Unknown, "Tempered Glass," Tecnoglass, www.tecnoglass.com/tempered.pdf, Date Unknown, 5 pages, Retrieved Jul. 28, 2015.
Author Unknown, "Thermal Tempering," EuropTec GmbH, Nov. 6, 2014, 2 pages.
Author Unknown, "Unsteady Heat Transfer—HT3: Experimental Studies of Thermal Diffusivities and Heat Transfer Coefficients," Date Unknown, 27 slides, Retrieved Jul. 21, 2015.
Ayinder, C.C. et al., "Thermal-Tempering Analysis of Bulk Metallic Glass Plates Using an Instant-Freezing Model," Metallurgical and Materials Transactions A, vol. 32A, Nov. 2001, pp. 2709-2715.
Baldwin, K. J. et al., "Confocal Raman Microspectroscopy through a Planar Interface," Applied Spectroscopy, vol. 55, No. 5, 2001, pp. 517-524.
Bandyopadhyay et al; "Application of Fused Deposition in Controlled Microstructure Metal-Ceramic Composites", Rapid Prototyping Journal, vol. 12 Issue 3, p. 121 128 (2006).
Barr, J. W., "Glass Tempering by Numbers," Aug. 2008, 8 pages.
Barr, Jonathan W., "The Tempering Process," Cardinal Waxachachie Tempering Seminar, Mar. 26, 2008, 36 slides.
Barr, Jonathan, "The Glass Tempering Handbook—Understanding the Glass Tempering Process," Self Published, 2015, 52 pages, http://www.lambertgtservices.co.uk/book/TheGlassTemperingHandbook.pdf.
Barsom, John M., "Fracture of Tempered Glass," Journal of the American Ceramic Society, vol. 51, No. 2, Feb. 1968, pp. 75-78.
Bartholomew, Roger F. et al., "Chapter 6: Chemical Strengthening of Glass," In "Glass: Science and Technology," vol. 5, Elasticity and Strength in Glass, Academic Press, May 28, 1980, pp. 217-270.
Beauchamp, Edwin K. et al., "Dynamics of Window Glass Fracture in Explosions," Sandia Report SAND98-0598 UC-700, Sandia National Laboratories, May 1998, 74 pages.
Bird, R. D., W. E. Stewart, and E. N. Lightfoot, Transport Phenomena—Chapter 11: The Equations of Change for Nonisothermal Systems, Wiley, (1960) pp. 349-373.
Bird, R. D., W. E. Stewart, and E. N. Lightfoot, Transport Phenomena—Chapter 3: The Equations of Change for Isothermal Systems, Wiley, (1960) pp. 75-113.
Boaz, Prem, "Tempering Very Thin Glass—What Radio Waves Mean for the Glass Industry," USGlass Magazine, vol. 45, Issue 3, Mar. 2010, 5 pages.
Boaz, Prem, "Thin glass processing with radio wave assist," Glass on Web, Last Reviewed: Jan. 2013, 6 pages, http://www.glassonweb.com/articles/article/561/.
Boguslavskll, I. A., "Studying the Nature of the Super-Strength of Glasses Strengthened by the Thermophysical Method," Glass and Ceramics, vol. 21, No. 10, Oct. 1964, pp. 562-567.
Brown, Angus M., "Nonlinear regression analysis of data using a spreadsheet," Application Note, ISC, Oct. 2001, pp. 58-59.
Chen, et al., "Nanopatterned Graphene on a Polymer Substrate by a Direct Peel-off Technique", ACS Appl. Mater. Interfaces, vol. 7, Issue 10, 2015, pp. 5938-5943.
Choi et al., "Influence of removing PMMA residues on surface of CVD graphene using a contact-mode atomic force Microscope" RSC Adv., vol. 7, 2017, pp. 6943-6949.
Conradt, Reinhard, "I. Fragility and its Relation to Other Glass Properties," IMI-NFG's MITT Course on Relaxation Processes in Glass Lecture 21, Apr. 6-8, 2010, 61 slides.
Conradt, Reinhard, "II. Networks," IIMI-NFG's Min Course on Relaxation Processes in Glass Lecture 22, Apr. 6-8, 2010, 61 slides.
Conway, Jr., Joseph C. et al., "Use of Crack Branching Data for Measuring Near-Surface Residual Stresses in empered Glass," Journal of the American Ceramic Society, vol. 72, No. 9, Sep. 1989, pp. 1584-1587.
Cox, Dr. Chris, "Lecture 3: Complex exponential function, Fourier and Laplace transforms," IMI-NFG's MITT Course on Relaxation Processes in Glass and Polymers Lecture 3, 2010, 25 slides.
Cox, Dr. Chris, "Lecture 4: Differential Equations," IMI-NFG's Min Course on Relaxation Processes in Glass and Polymers Lecture 4, 2010, 24 slides.
Danishkin, G. K. et al., "Development of a Continuous Method of Bending and Toughening Glass," Glass and Ceramics, vol. 34, Issue 8, Aug. 1977, pp. 495-498.
Daudeville, L. et al., "Numerical Simulation of Soda-Lime Silicate Glass Tempering," Journal de Physique IV, France, vol. 6, No. C1, Jan. 1996, pp. C1-175-C1-185.

(56) References Cited

OTHER PUBLICATIONS

Daudeville, Laurent et al., "Thermal Tempering Simulation of Glass Plates: Inner and Edge Residual Stresses," Journal of Thermal Stresses, vol. 21, 1998, pp. 667-689.
De Grauw, C. J. et al., "Axial resolution of confocal Raman microscopes: Gaussian beam theory and practice," Journal of Microscopy, vol. 188, PI. 3, Dec. 1997, pp. 273-279.
Deschamps, T. et al., "Soda-lime silicate glass under hydrostatic pressure and indentation: a micro-Raman study," Abstract, 2011, 1 page.
Deschamps, T. et al., "Soda-lime silicate glass under hydrostatic pressure and indentation: a micro-Raman study," Journal of Physics: Condensed Matter, vol. 23, 2011, 7 pages.
Donald, I. W., "Review: Methods for improving the mechanical properties of oxide glasses," Journal of Materials Science, vol. 24, 1989, pp. 4177-4208.
DR.Tallant, T.A. Michalske, and W.L. Smith, "The effects of tensile stress on the Raman spectrum of silica glass," J. Non-Cryst. Solids, 106 380-383 (1988).
Electronic Cooling Editors, "The Thermal Conductivity of Gases", Design, Materials, Adhesives, Substrates, No. 3, Technical Data, Test & Measurement, vol. 4, Gases, Thermal Conductivity, Sep. 1, 1998, 2 pages.
Ernsberger, F. M., "Chapter 1: Elastic Properties of Glasses," In "Glass: Science and Technology," vol. 5, Elasticity and Strength in Glasses, Academic Press, Inc., May 28, 1980, pp. 1-19.
Ernsberger, F. M., "Chapter 4: Techniques of Strengthening Glasses," In "Glass: Science and Technology," vol. 5, Elasticity and Strength in Glasses, Academic Press, Inc., May 28, 1980, pp. 133-144.
Europtec; "Themal Tempering" ; Europtec GMBH, DIC, 06.11. 2014; www.europtec.de.
Everall, Neil et al., "Optimizing Depth Resolution in Confocal Raman Microscopy: A Comparison of Metallurgical, Dry Corrected, and Oil Immersion Objectives," Applied Sprectroscopy, vol. 61, No. 3, 2007, pp. 251-259.
Everall, Neil J., "Confocal Raman Microscopy: Why the Depth Resolution and Spatial Accuracy Can Be Much Worse then You Think," Applied Spectroscopy, vol. 54, No. 10, 2000, pp. 1515-1520.
Fajans, Kasimir et al., "Properties and Structures of Vitreous and Crystalline Boron Oxide," Journal of the American Chemical Society, vol. 74, No. 11, Jun. 5, 1952, pp. 2761-2768.
Fotheringham, Dr. Ulrich, "Lecture 1: Internet teaching set-up," IMI-NFG's MITT Course on Relaxation Processes in Glass and Polymers Lecture 1, 2010, 6 slides.
Fotheringham, Dr. Ulrich, "Lecture 2: Phenomenology of viscoelasticity & glass transition," IMI-NFG's MITT Course on Relaxation Processes in Glass and Polymers Lecture 2, 2010, 17 slides.
Fotheringham, Dr. Ulrich, "Lecture 5: Viscoelasticity I—Shear," IMI-NFG's MITI Course on Relaxation Processes in Glass and Polymers Lecture 5, 2010, 19 slides.
Fotheringham, Dr. Ulrich, "Lecture 6: Viscoelasticity II—Bulk Viscoelasticity," IMI-NFG's MITI Course on Relaxation Processes in Glass and Polymers Lecture 6, 2010, 16 slides.
Fotheringham, Dr. Ulrich, "Lecture 7: Viscoelasticity III—Dynamic Testing," IMI-NFG's MITI Course on Relaxation Processes in Glass and Polymers Lecture 7, 2010, 19 slides.
Fotheringham, Dr. Ulrich, "Lecture 8: Viscoelasticity IV—Important Application of Pre-Stressing," IMI-NFG's MITT Course on Relaxation Processes in Glass and Polymers Lecture 8, 2010, 12 slides.
Freiman, S. W., "Chapter 2: Fracture Mechanics of Glass," In "Glass: Science and Technology," vol. 5, Elasticity and Strength in Glasses, Academic Press, Inc., May 28, 1980, pp. 21-78.
Frick, B. et al., "The Microscopic Basis of the Glass Transition in Polymers from Neutron Scattering Studies," Science, vol. 267, Mar. 31, 1995, pp. 1939-1945.
Galeener, Frank L., "Raman and ESR Studies of the Thermal History of Amorphous $SiO_2$," Journal of Non-Crystalline Solids, vol. 71, 1985, pp. 373-386.
Gammelgaard et al., "Graphene transport properties upon exposure to PMMA processing and heat treatments", 2D Materials, vol. 1, 2014, 035005, 12 pages.
Gang, Zhang Ming, "Manufacturing and Properties of Glass Used in Construction," Guangdong Golden Glass Technologies Ltd, Dec. 27, 2002, 11 pages.
Gao, "Glass weathering and methods for preventing it," Wuhan University of Technology Press, Dec. 31, 1995, 5 pags (Translation Attached.
Gardon, Robert, "Calculation of Temperature Distributions in Glass Plates Undergoing Heat-Treatment," Journal of the American Ceramic Society, vol. 41, No. 6, Jun. 1958, pp. 200-209.
Gardon, Robert, "Chapter 5: Thermal Tempering of Glass," In "Glass: Science and Technology," vol. 5, Elasticity and Strength in Glasses, Academic Press, Inc., May 28, 1980, pp. 145-216.
Gardon, Robert, "Tempering Glass with Modulated Cooling Schedules," Journal of the American Ceramic Society, vol. 71, No. 10, Oct. 1988, pp. 876-878.
Gardon, Robert, "Variation of Densities and Refractive Indices in Tempered Glass," Journal of the American Ceramic Society, vol. 61, No. 3-4, Mar.-Apr. 1978, pp. 143-146.
Gardon; "Thermal Tempering of Glass"; pp. 146-216 in Glass: Science and Technology, vol. 5, Elasticity and Strentth in Glasses, Ed. by D.R. Uhlmann and N.J. Kreidl, Academic Press, New York, 1980.
Glass Unlimited "AGC Technical Data Sheet Planibel". ; Nov. 2011 (Year: 2011).
Glass, Jill et al., "Processing and Properties of Ion Exchanged Glasses," Glass and Optical Materials Division Fall Meeting, Nov. 6-12, 2004, Cape Canaveral, FL, 33 slides.
Glass, S. J. et al., "Stressed Glass Technology for Actuators and Removable Barrier Applications," Sandia Report SAND2007-4106, Sandia National Laboratories, Jul. 2007, 18 pages.
Gomez, Sinue et al., "69.2: Designing Strong Glass for Mobile Devices," SID Symposium Digest of Technical Papers, vol. 40, No. 1, Jan. 2009, pp. 1045-1048.
Gross et al. "A glass with high crack initiation load: Role of fictive temperature-independent mechanical properties"; Journal of Non-crystalline Solids 355 (2009) pp. 563-568 (Year: 2009).
Gross, T.M., "Deformation and cracking behavior of glasses indented with diamond tips of various sharpness," Journal of Non-Crystalline Solids, vol. 358, Issue 24, Dec. 12, 2012, pp. 3445-3452.
Guillemet, C., "Annealing and Tempering of Glass," Journal of Non-Crystalline Solids, vol. 123, 1990, pp. 415-426.
Gulati, Suresh T., "Frangibility of Tempered Soda-Lime Glass Sheet," Glass Processing Days, Sep. 13-15, 1997, pp. 72-76.
Guo, Xiaoju et al. "Unified approach for determining the enthalpic fictive temperature of glasses with arbitrary thermal history" Journal of Non-Crystalline Solids, vol. 357, 2011, pp. 3230-3236.
Gupta, Prabhat K et al., "The laboratory glass transition," The Journal of Chemical Physics, vol. 126, 2007, 9 pages.
Gupta, Prabhat, "Landscape Approach to Glass Transition and Relaxation: Basic Concepts (contd.)," IMI-NFG's MITT Course on Relaxation Processes in Glass Lecture 18, Mar. 25, 2010, 23 slides.
Gupta, Prabhat, "Landscape Approach to Glass Transition and Relaxation: Four lectures on 'The Landscape Approach," IMI-NFG's MITT Course on Relaxation Processes in Glass Lecture 17, Mar. 23, 2010, 28 slides.
Gupta, Prabhat, "Landscape Approach to Glass Transition and Relaxation: Liquid to Glass Transition," IMI-NFG's MITT Course on Relaxation Processes in Glass Lecture 19, Mar. 30, 2010, 25 slides.
Gupta, Prabhat, "Landscape Approach to Glass Transition and Relaxation: Relaxation in the glassy state," IMI-NFG's Min Course on Relaxation Processes in Glass Lecture 20, Apr. 1, 2010, 20 slides.
Gy, Rene, "Ion exchange for glass strengthening," Materials Science and Engineering B, vol. 149, 2008, pp. 159-165.

\* cited by examiner

GLASS LAMINATE WITH BURIED STRESS SPIKES TO ARREST CRACKS AND METHODS OF MAKING THE SAME

CROSS-REFERENCE TO RELATED APPLICATIONS

This application is a divisional of U.S. patent application Ser. No. 17/632,086, filed on Feb. 1, 2022, which claims the benefit of priority under 35 U.S.C. § 371 of International Application No. PCT/US2020/044436, filed on Jul. 31, 2020, which claims the benefit of priority under 35 U.S.C. § 119 of U.S. Provisional Application Ser. No. 62/883,401, filed on Aug. 6, 2019, the content of each of which is relied upon and incorporated herein by reference in its entirety.

BACKGROUND

Field

The present specification generally relates to glass articles and, more particularly, to laminated glass articles including a plurality of glass layers and methods for forming the same.

Technical Background

Glass articles can be used in a wide variety of products, including, for example, auto-glazing, architectural panels, appliances, and cover glass (e.g., for touch-screen devices such as smartphones, tablets, laptop computers, and monitors). Relatively large flaws can be introduced into the surfaces of the glass articles during use. For example, when a smartphone is dropped on a rough surface, such as asphalt, the local indention caused by contact with sharp features of the rough surface can cause flaws as deep as about 300 µm in the surface of the cover glass.

Accordingly, a need exists for glass articles with improved resistance to breakage caused by deep flaws, improved mechanical reliability, and improved drop performance.

SUMMARY

According to a first aspect disclosed herein, a laminated glass article comprises a core layer comprising a core glass composition, and a cladding layer directly adjacent to the core layer and comprising a clad glass composition. A stress of the cladding layer increases with increasing distance from an outer surface of the cladding layer from a compressive stress to a tensile stress, transitions to a compressive stress as a step-change at an interface region between the core layer and the cladding layer, and increases with increasing distance from the interface region to a center of the core layer from the compressive stress to a tensile stress.

According to a second aspect, a laminated glass article includes the laminated glass article according to the first aspect, wherein the core glass composition has an average core coefficient of thermal expansion ($CTE_{core}$) and the cladding layer has an average cladding coefficient of thermal expansion ($CTE_{clad}$) that is greater than the $CTE_{core}$.

According to a third aspect, a laminated glass article includes the laminated glass article according to the first or second aspects, wherein the laminated glass article is ion-exchange strengthened.

According to a fourth aspect, a laminated glass article includes the laminated glass article according to any preceding aspect, wherein the core glass composition and the clad glass composition comprise one or more alkali oxides.

According to a fifth aspect, a laminated glass article includes the laminated glass article according to any preceding aspect, wherein a maximum tensile stress in the cladding layer is greater than or equal to a maximum tensile stress in the core layer.

According to a sixth aspect, a laminated glass article includes the laminated glass article according to any preceding aspect, wherein a maximum compressive stress of the core layer is greater than a maximum compressive stress of the cladding layer.

According to a seventh aspect, a laminated glass article includes the laminated glass article according to any preceding aspect, wherein a magnitude of the stress at the outer surface is greater than or equal to about 300 MPa.

According to an eighth aspect, a laminated glass article includes the laminated glass article according to any preceding aspect, wherein a maximum magnitude of the stress of the laminated glass article is less than or equal to about 400 MPa.

According to a ninth aspect, a laminated glass article comprises a core layer comprising a core glass composition, and a cladding layer directly adjacent to the core layer and comprising a cladding glass composition. A concentration of Li ions increases with increasing distance from an outer surface of the cladding layer to a centerline of the core layer; a concentration of K ions decreases with increasing distance from the outer surface of the cladding layer to an interface between the cladding layer and the core layer; and a concentration of Na ions increases with increasing distance from the outer surface of the cladding layer to a maximum concentration of Na ions in the cladding layer or at the interface between the cladding layer and the core layer and transitions to a lower concentration of Na ions relative to the maximum concentration of Na ions via a step change at the interface between the cladding layer and the core layer.

According to a tenth aspect, a laminated glass article includes the laminated glass article according to the ninth aspect, wherein the concentration of Na ions decreases with increasing distance from the interface between the cladding layer and the core layer to the centerline of the core layer.

According to an eleventh aspect, a laminated glass article includes the laminated glass article according to the ninth aspect, wherein the concentration of Na ions increases and then decreases with increasing distance from the interface between the cladding layer and the core layer to the centerline of the core layer.

According to a twelfth aspect, a laminated glass article includes the laminated glass article according to any of the ninth through eleventh aspects, wherein the concentration of Li ions increases according to a non-linear relationship.

According to a thirteenth aspect, the laminated glass article includes the laminated glass article according to any of the ninth through twelfth aspects, wherein a concentration of K ions in the core layer is zero.

According to a fourteenth aspect, the laminated glass article includes the laminated glass article according to the ninth aspect, wherein the concentration of Na ions increases from the outer surface of the cladding layer to the maximum concentration of Na ions according to a linear relationship.

According to a fifteenth aspect, the laminated glass article includes the laminated glass article according to the ninth aspect, wherein the concentration of Na ions increases from the outer surface of the cladding layer to the maximum concentration of Na ions according to a non-linear relationship.

According to a sixteenth aspect, a method of preparing a laminated glass article comprises laminating at least one core layer and at least one cladding layer to form a laminated glass article, the at least one core layer comprising an ion-exchangeable core glass composition and the at least one cladding layer comprising an ion-exchangeable clad glass composition; and contacting the laminated glass article with an ion exchange bath comprising at least one ion source for a time such that a maximum compressive stress in the at least one core layer is greater than a maximum compressive stress in the at least one cladding layer.

According to a seventeenth aspect, a method comprises the method according to the sixteenth aspect, wherein the at least one core layer has an average core coefficient of thermal expansion ($CTE_{core}$) and the at least one cladding layer has an average cladding coefficient of thermal expansion ($CTE_{clad}$) that is greater than the $CTE_{core}$.

According to an eighteenth aspect, a method comprises the method according to the sixteenth or seventeenth aspect, wherein the ion exchange bath comprises at least a first ion source and a second ion source that is different from the first ion source.

According to a nineteenth aspect, a method comprises the method according to any one of the sixteenth through eighteenth aspects, wherein a maximum tensile stress in the at least one cladding layer is greater than or equal to a maximum tensile stress in the at least one core layer after the contacting with the ion exchange bath.

According to a twentieth aspect, a method comprises the method according to any one of the sixteenth through nineteenth aspects, wherein a magnitude of stress at an outer surface of the glass article is greater than or equal to about 300 MPa after the contacting with the ion exchange bath.

Additional features and advantages will be set forth in the detailed description, which follows, and in part will be readily apparent to those skilled in the art from that description or recognized by practicing the embodiments described herein, including the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
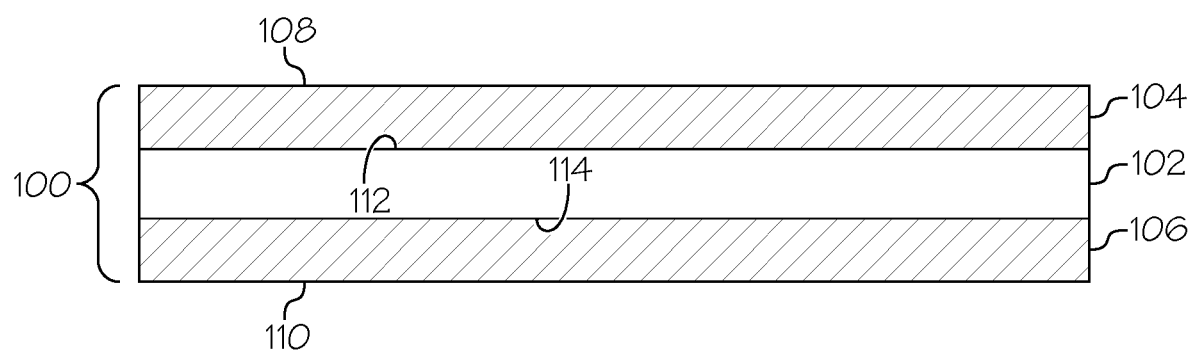
FIG. 1 is a cross-sectional view of a glass article in accordance with one or more embodiments shown and described herein.

Reference will now be made in detail to various embodiments, examples of which are illustrated in the accompanying drawings. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

As used herein, the term "average coefficient of thermal expansion," or "average CTE," refers to the average coefficient of linear thermal expansion of a given material or layer between 0° C. and 300° C. As used herein, the term "coefficient of thermal expansion," or "CTE," refers to the average coefficient of thermal expansion unless otherwise indicated.

Compressive stress (including surface compressive stress) is measured by a refracted near-field (RNF) technique. Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) may be measured with the RNF technique or a scattered light polariscope (SCALP) technique known in the art. The maximum central tension (CT) values are measured using a scattered light polariscope (SCALP) technique known in the art.

Concentration profiles of various constituent components in the glass, such as alkali constituent components, were measured by electron probe microanalysis (EPMA). EPMA may be utilized, for example, to discern compressive stress in the glass due to the ion exchange of alkali ions into the glass from compressive stress due to lamination.

The phrase "depth of compression" and "DOC" refer to the position in the glass where compressive stress transitions to tensile stress.

The term "formed from" can mean one or more of comprises, consists essentially of, or consists of. For example, a component that is formed from a particular material can comprise the particular material, consist essentially of the particular material, or consist of the particular material.

In various embodiments, a glass article comprises at least a first layer and a second layer. For example, the first layer comprises a core layer, and the second layer comprises one or more cladding layers 104, 106 adjacent to the core layer. The first layer and/or the second layer are glass layers comprising a glass material, a ceramic material, a glass-ceramic material, or a combination thereof. In some embodiments, the first layer and/or the second layer are transparent glass layers.

The core layer has a core CTE, and the cladding layer has a cladding CTE. For example, the core layer is formed from a first glass composition with the core CTE and the cladding layer is formed from a second glass composition with the cladding CTE. In some embodiments described herein, the core CTE is less than the cladding CTE (i.e., the cladding CTE is greater than the core CTE) such that the core layer is in compression and the cladding layer is in tension, prior to any ion exchange treatment. In some embodiments, after the glass article is subjected to an ion exchange treatment, a stress profile of the glass article increases with increasing distance from an outer surface of the cladding layer from a compressive stress to a tensile stress, transitions to a compressive stress as a step-change at an interface region between the core layer and the cladding layer, and increases with increasing distance from the interface region to a center of the core layer from the compressive stress to a tensile stress. Such "jumping" tension-compression profiles and otherwise non-conventional stress profiles in the glass article can enable deeper cracks to be arrested, as will be described in greater detail below.

FIG. 1 is a cross-sectional view of one embodiment of a glass article 100. The glass article 100 is a laminated sheet including a plurality of glass layers. In embodiments, the laminated sheet may be substantially planar, as shown in FIG. 1, or the laminated sheet may be non-planar. The glass article 100 comprises a core layer 102 disposed between a first cladding layer 104 and a second cladding layer 106. In some embodiments, the first cladding layer 104 and the second cladding layer 106 are exterior layers relative to the core layer 102, as shown in FIG. 1. For example, an outer surface 108 of the first cladding layer 104 serves as an outer surface of the glass article 100 and/or an outer surface 110 of the second cladding layer 106 serves as an outer surface of the glass article 100. In other embodiments, the first cladding layer 104 and/or the second cladding layer 106 are intermediate layers disposed between the core layer 102 and an exterior layer (not shown).

The core layer 102 comprises a first major surface and a second major surface opposite the first major surface. In some embodiments, the first cladding layer 104 is fused to the first major surface of the core layer 102. Additionally or alternatively, the second cladding layer 106 is fused to the second major surface of the core layer 102. In such embodiments, an interface 112 between the first cladding layer 104 and the core layer 102 and/or an interface 114 between the second cladding layer 106 and the core layer 102 are free of any bonding material such as, for example, an adhesive, a coating layer, or any non-glass material added or configured to adhere the respective cladding layers 104, 106 to the core layer 102. Thus, the first cladding layer 104 and/or the second cladding layer 106 are fused directly to the core layer 102 and/or are directly adjacent to the core layer 102. In some embodiments, the glass article 100 includes one or more intermediate layers disposed between the core layer 102 and the first cladding layer and/or between the core layer 102 and the second cladding layer. For example, the intermediate layers may comprise intermediate glass layers and/or diffusion layers formed at the interface of the core layer 102 and the cladding layer. The diffusion layer can comprise a blended region comprising components of each layer adjacent to the diffusion layer (e.g., a blended region between two directly adjacent glass layers). In some embodiments, the glass article 100 comprises a glass-glass laminate in which the interfaces between directly adjacent glass layers are glass-glass interfaces.

In some embodiments, the core layer 102 comprises a first glass composition (also referred to herein as a core glass composition) and first and/or second cladding layers 104, 106 comprise a second glass composition (also referred to herein as a clad glass composition) that is different from the first glass composition. The first glass composition and the second glass composition are different from each other prior to chemically strengthening the glass article 100 as described herein. For example, in the embodiment shown in FIG. 1, the core layer 102 comprises the first glass composition and each of the first cladding layer 104 and the second cladding layer 106 comprises the second glass composition. In other embodiments, the first cladding layer comprises the second glass composition and the second cladding layer comprises a third glass composition that is different from the first glass composition and/or the second glass composition.

In various embodiments, the core layer 102 is formed from an ion exchangeable core glass composition and the cladding layers 104, 106 are formed from an ion exchangeable clad glass composition. In embodiments, as described above and below, the core glass composition and the clad glass composition have different coefficients of thermal expansion.

Figure 2:
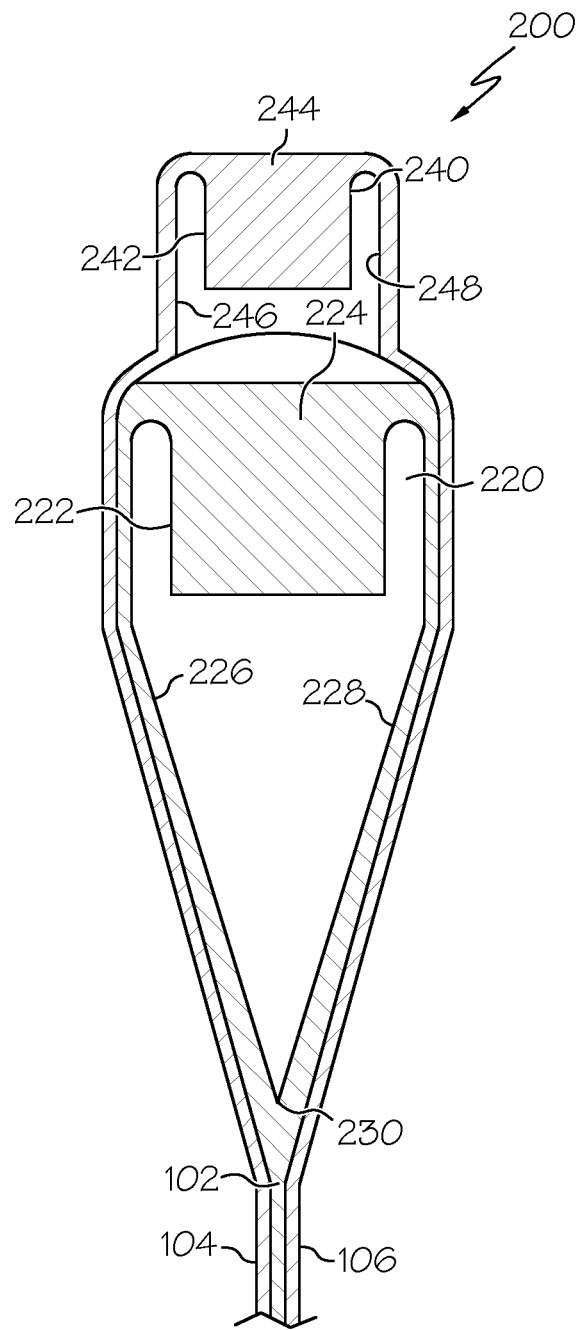
FIG. 2 is a cross-sectional view of an overflow distributor that can be used for forming a glass article in accordance with one or more embodiments shown and described herein.

The glass article can be formed using a suitable process such as, for example, a fusion draw, down draw, slot draw, up draw, or float process. In some embodiments, the glass article 100 is formed using a fusion draw process. FIG. 2 is a cross-sectional view of an example embodiment of overflow distributor 200 that can be used to form a glass article such as, for example, the glass article 100.

The overflow distributor 200 can be configured as described in U.S. Pat. No. 4,214,886, which is incorporated by reference in its entirety. For example, the fusion draw apparatus includes a lower overflow distributor 220 and an upper overflow distributor 240 positioned above the lower overflow distributor 220. The lower overflow distributor 220 includes a trough 222. A first glass composition 224 is melted and fed into the trough 222 in a viscous state. The first glass composition 224 forms the core layer 102 of the glass article 100 as further described below. The upper overflow distributor 240 includes a trough 242. A second glass composition 244 is melted and fed into the trough 242 in a viscous state. The second glass composition 244 forms first and second cladding layers 104, 106 of the glass article 100 as further described below.

The first glass composition 224 overflows trough 222 and flows down opposing outer forming surfaces 226 and 228 of the lower overflow distributor 220. The outer forming surfaces 226 and 228 converge at a draw line 230. The separate streams of the first glass composition 224 flowing down respective outer forming surfaces 226 and 228 of the lower overflow distributor 220 converge at the draw line 230 where they are fused together to form the core layer 102 of the glass article 100.

The second glass composition 244 overflows the trough 242 and flows down opposing outer forming surfaces 246 and 248 of the upper overflow distributor 240. The second glass composition 244 is deflected outward by the upper overflow distributor 240 such that the second glass composition 244 flows around the lower overflow distributor 220 and contacts the first glass composition 224 flowing over the outer forming surfaces 226 and 228 of the lower overflow distributor 220. The separate streams of the second glass composition 244 are fused to the respective separate streams of the first glass composition 224 flowing down the respective outer forming surfaces 226 and 288 of the lower overflow distributor 220. Upon convergence of the streams of the first glass composition 224 at the draw line 230, the second glass composition 244 forms first and second cladding layers 104, 106 of the glass article 100.

In some embodiments, the first glass composition 224 of the core layer 102 in the viscous state is contacted with the second glass composition 244 of the first and second cladding layers 104, 106 in the viscous state to form the laminated sheet. In some of such embodiments, the laminated sheet is part of a glass ribbon traveling away from the draw line 230 of the lower overflow distributor 220, as shown in FIG. 2. The glass ribbon can be drawn away from the lower overflow distributor 220 by a suitable means including, for example, gravity and/or pulling rollers. The glass ribbon cools as it travels away from the lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, the glass article 100 comprises the laminated sheet as shown in FIG. 1. In other embodiments, the laminated sheet can be processed further (e.g., by cutting or molding) to form the glass article.

Although the glass article 100 is shown in FIG. 1 as including three layers, other embodiments are contemplated. For example, the glass article may have two, four, or more layers. Glass articles including two layers can be formed using two overflow distributors positioned such that the two layers are joined while traveling away from the respective draw lines of the overflow distributors or by using a single overflow distributor with a divided trough such that two glass compositions flow over opposing outer forming surfaces of the overflow distributor and converge at the draw line of the overflow distributor. Glass articles including four layers can be formed using additional overflow distributors and/or using overflow distributors with divided troughs. Thus, a glass article having a predetermined number of layers can be formed by modifying the overflow distributor accordingly.

Although the glass article 100 is shown in FIG. 1 as comprising a laminated sheet, other forms are contemplated. For example, the glass article may be in the form of a laminated tube comprising multiple tubular layers (e.g., formed by one or more annular orifices), and a partial cross-section of the laminated tube may have a laminated structure similar to that shown in FIG. 1. In other embodiments, the glass article may be a shaped glass article, such as may be formed by shaping or molding a laminated sheet.

In some embodiments, the glass article 100 has a thickness of at least about 0.05 mm, at least about 0.1 mm, at least about 0.2 mm, or at least about 0.3 mm. Additionally or alternatively, the glass article 100 has a thickness of less than about 2 mm, less than about 1.5 mm, less than about 1 mm, less than about 0.7 mm, or less than about 0.5 mm. In some embodiments, a ratio of a thickness of the core layer 102 to a thickness of the glass article 100 is at least about 0.7, a least about 0.8, at least about 0.85, at least about 0.9, or at least about 0.95. Additionally or alternatively, the ratio of the thickness of the core layer 102 to the thickness of the glass article 100 is less than about 0.95, less than about 0.93, less than about 0.9, less than about 0.87, or less than about 0.85. In some embodiments, a thickness of the second layer (e.g., each of the first cladding layer 104 and the second cladding layer 106) is from about 0.01 mm to about 0.3 mm.

In some embodiments, the first glass composition and/or the second glass composition have a liquidus viscosity suitable for forming the glass article 100 using a fusion draw process as described herein. For example, the first glass composition of the core layer 102 may have a liquidus viscosity of at least about 100 kP, at least about 200 kP, or at least about 300 kP. Additionally or alternatively, the first glass composition comprises a liquidus viscosity of less than about 3000 kP, less than about 2500 kP, less than about 1000 kP, or less than about 800 kP. The second glass composition of the first and/or second cladding layers 104 and 106 may have a liquidus viscosity of at least about 50 kP, at least about 100 kP, or at least about 200 kP. Additionally or alternatively, the second glass composition comprises a liquidus viscosity of less than about 3000 kP, less than about 2500 kP, less than about 1000 kP, or less than about 800 kP. The first glass composition can aid in carrying the second glass composition over the overflow distributor to form the second layer. Accordingly, the second glass composition can have a liquidus viscosity that is lower than generally considered suitable for forming a single layer sheet using a fusion draw process.

In various embodiments described herein, the glass article 100 is strengthened by a combination of mechanical strengthening and chemical strengthening. For example, the glass article 100 may have a CTE mismatch as described herein, and may be chemically strengthened, such as by an ion exchange treatment, to further increase the compressive stress near the outer surface of the second layer and/or to form a compressive peak within the second layer.

In various embodiments, the glass article 100 is mechanically strengthened. For example, the second glass composition forming the first and/or second cladding layers 104, 106 may have a different CTE than the first glass composition forming the core layer 102. In particular, in some embodiments, the first and second cladding layers 104, 106 may be formed from a glass composition having a higher CTE than the glass composition of the core layer 102. The CTE mismatch (i.e., the difference between the CTE of the first and second cladding layers 104, 106 and the CTE of the core layer 102) results in the formation of compressive stress in the core layer 102 and tensile stress in the cladding layers 104, 106 upon cooling of the glass article 100. In various embodiments, each of the first and second cladding layers 104, 106, independently, can have a higher CTE, a lower CTE, or substantially the same CTE as the core layer 102. Surface compressive stresses tend to suppress existing surface flaws from developing into cracks.

In embodiments, the CTE of the core layer 102 and the CTE of the first and/or second cladding layers 104, 106 differ by at least about $5 \times 10^{-7\circ}$ C.$^{-1}$, at least about $15 \times 10^{-7\circ}$ C.$^{-1}$, at least about $25 \times 10^{-7\circ}$ C.$^{-1}$, or at least about $30 \times 10^{-7\circ}$ C.$^{-1}$. Additionally or alternatively, the CTE of the core layer 102 and the CTE of the first and/or second cladding layers 104, 106 differ by less than about $100 \times 10^{-7\circ}$ C.$^{-1}$, less than about $75 \times 10^{-7\circ}$ C.$^{-1}$, less than about $50 \times 10^{-7\circ}$ C.$^{-1}$, less than about $40 \times 10^{-7\circ}$ C.$^{-1}$, less than about $30 \times 10^{-7\circ}$ C.$^{-1}$, less than about $20 \times 10^{-7\circ}$ C.$^{-1}$, or less than about $10 \times 10^{-7\circ}$ C.$^{-1}$. For example, in some embodiments, the CTE of the core layer 102 and the CTE of the first and/or second cladding layers 104, 106 differ by about $5 \times 10^{-7\circ}$ C.$^{-1}$ to about $30 \times 10^{-7\circ}$ C.$^{-1}$, or about $5 \times 10^{-7\circ}$ C.$^{-1}$ to about $20 \times 10^{-7\circ}$ C.$^{-1}$. In some embodiments, the second glass composition of the first and/or second cladding layer has a CTE of less than about $66 \times 10^{-7\circ}$ C.$^{-1}$, less than about $55 \times 10^{-7\circ}$ C.$^{-1}$, less than about $50 \times 10^{-7\circ}$ C.$^{-1}$, less than about $40 \times 10^{-7\circ}$ C.$^{-1}$, or less than about $35 \times 10^{-7\circ}$ C.$^{-1}$. Additionally or alternatively, the second glass composition of the first and/or second cladding layer has a CTE of at least about $10 \times 10^{-7\circ}$ C.$^{-1}$, at least about $15 \times 10^{-7\circ}$ C.$^{-1}$, at least about $25 \times 10^{-7\circ}$ C.$^{-1}$, or at least about $30 \times 10^{-7\circ}$ C.$^{-1}$. The first glass composition of the core layer 102 may have a CTE of at least about $40 \times 10^{-7\circ}$ C.$^{-1}$, at least about $50 \times 10^{-7\circ}$ C.$^{-1}$, at least about $55 \times 10^{-7\circ}$ C.$^{-1}$, at least about $65 \times 10^{-7\circ}$ C.$^{-1}$, at least about $70 \times 10^{-7\circ}$ C.$^{-1}$, at least about $80 \times 10^{-7\circ}$ C.$^{-1}$, or at least about $90 \times 10^{-7\circ}$ C.$^{-1}$. Additionally or alternatively, the first glass composition of the core layer may have a CTE of less than about $120 \times 10^{-7\circ}$ C.$^{-1}$, less than about $110 \times 10^{-7\circ}$ C.$^{-1}$, less than about $100 \times 10^{-7\circ}$ C.$^{-1}$, less than about $90 \times 10^{-7\circ}$ C.$^{-1}$, less than about $75 \times 10^{-7\circ}$ C.$^{-1}$, or less than about $70 \times 10^{-7\circ}$ C.$^{-1}$.

In various embodiments described herein, the glass article 100 is chemically strengthened. For example, the glass article 100 may be subjected to an ion exchange treatment to increase the compressive stress in a region of the glass article at an outer surface of the glass article (e.g., an outer portion of the cladding layer). In some embodiments, the ion exchange treatment comprises applying an ion exchange medium to one or more surfaces of the glass article 100. The ion exchange medium may be a solution, a paste, a gel, or another suitable medium comprising larger ions to be exchanged with smaller ions in the glass (e.g., the glass of the second layer). The terms "larger ions" and "smaller ions" are relative terms, meaning that the larger ions are relatively large compared to the smaller ions and the smaller ions are relatively small compared to the larger ions. Thus, the larger ions have a larger ionic radius than the smaller ions, and the smaller ions have a smaller ionic radius than the larger ions. In some embodiments, the cladding layer of the glass article 100 comprises an alkali aluminosilicate glass. Thus, the smaller ions in the cladding layer of the glass article and the larger ions in the ion exchange medium may be monovalent alkali metal cations (e.g., Li$^+$, Na$^+$, and/or K$^+$). Alternatively, monovalent cations in the glass article 100 may be replaced with monovalent cations other than alkali metal cations (e.g., Ag$^+$ or the like). In some embodiments, the cladding layer of the glass article 100 comprises an alkaline earth aluminosilicate glass. Thus, the smaller ions in the cladding layer of the glass article and the larger ions in the ion exchange medium may be divalent alkaline earth cations (e.g., Be$^{2+}$, Mg$^{2+}$, Ca$^{2+}$, and/or Sr$^{2+}$). In some embodiments, the ion exchange medium comprises a molten salt solution, and the ion exchange treatment comprises immersing the laminated glass article in a molten salt bath comprising larger ions (e.g., K$^+$, Na$^+$, Sr$^{2+}$, and/or Ca$^{2+}$) to be exchanged with smaller ions (e.g., Na$^+$, Li$^+$, Ca$^{2+}$, and/or Mg$^{2+}$) in the glass. In some embodiments, the molten salt bath comprises a salt (e.g., a nitrate, a sulfate, and/or a chloride) of the larger ions. For example, the molten salt bath may include molten KNO$_3$, molten NaNO$_3$, or a combination thereof. Additionally or alternatively, the temperature of the molten salt bath may be from about 380° C. to about 450° C., and an immersion time is from about 2 hours to about 16 hours.

By replacing smaller ions in the glass with larger ions at the surface of the glass article 100, the compressive stress of the cladding layer is increased at the outer surface of the glass article. For example, during the ion exchange treatment, the larger ions from the ion exchange medium diffuse into an outer portion of the cladding layer of the glass article 100 and the smaller ions from the glass diffuse out of the outer portion of the cladding layer of the glass article. Thus, the outer portion of the cladding layer comprises an exchanged region of the glass article. The increased concentration of the larger ions in the ion exchanged region causes crowding of the glass and increases the compressive stress of the glass article 100 in the ion exchanged region. In some embodiments, subjecting the glass article 100 to the ion exchange treatment increases a surface compressive stress at the outer surface of the glass article (e.g., from an initial surface compressive stress generated by the CTE mismatch) to a final compressive stress value. For example, the final compressive stress value is at least about 200 MPa, at least about 300 MPa, at least about 400 MPa, at least about 500 MPa, at least about 600 MPa, at least about 700 MPa, at least about 800 MPa, at least about 900 MPa, or at least about 1,000 MPa. Additionally or alternatively, the final compressive stress value is less than about 1300 MPa, less than about 1200 MPa, less than about 1000 MPa, less than about 900 MPa, less than about 800 MPa or less than about 600 MPa.

In various embodiments herein, the core layer 102 is ion exchange strengthened through the cladding layers 104, 106. The core layer 102 and the cladding layers 104, 106 have different compositional characteristics to achieve these properties. The compositional characteristics of each glass composition produces a unique alkali ion diffusion profile through the thickness of the laminated glass article after strengthening by ion exchange.

Prior to ion exchange strengthening, the concentration of various constituent components of the glass network (e.g., glass formers such as $SiO_2$ and $B_2O_3$, intermediates such as $Al_2O_3$, and modifiers such as CaO, $Na_2O$, etc.) of the cladding layers 104, 106 are generally uniformly distributed from the outer surfaces of the laminated glass article to the respective interface regions. For example, the cladding layers 104, 106 comprise at least one glass former and a concentration of the glass former is substantially constant from the outer surface of the glass article to the interface between the cladding layer and the core layer 102. In addition, the cladding layers 104, 106 comprise at least one modifier, such as $Na_2O$ and/or another alkali oxide, and a concentration of the modifier is substantially constant from the outer surface of the glass article to the interface between the cladding layer and the core layer 102.

Similarly, the concentration of various constituent components of the glass network (e.g., glass formers such as $SiO_2$ and $B_2O_3$, intermediates such as $Al_2O_3$, and modifiers such as CaO, $Na_2O$, etc.) of the core layer 102 are generally uniformly distributed from the respective interface to the centerline of the core layer 102. The term "centerline" as used herein, refers to the midpoint of the thickness of the core layer 102. For example, the core layer 102 comprises at least one glass former and a concentration of the glass former is substantially constant from a core side of the interface to the centerline of the core layer 102. In addition, the core layer 102 comprises at least one modifier, such as $Na_2O$ and/or another alkali oxide, and a concentration of the glass modifier is substantially constant from a core side of the interface to the centerline of the core layer 102.

Figure 3:
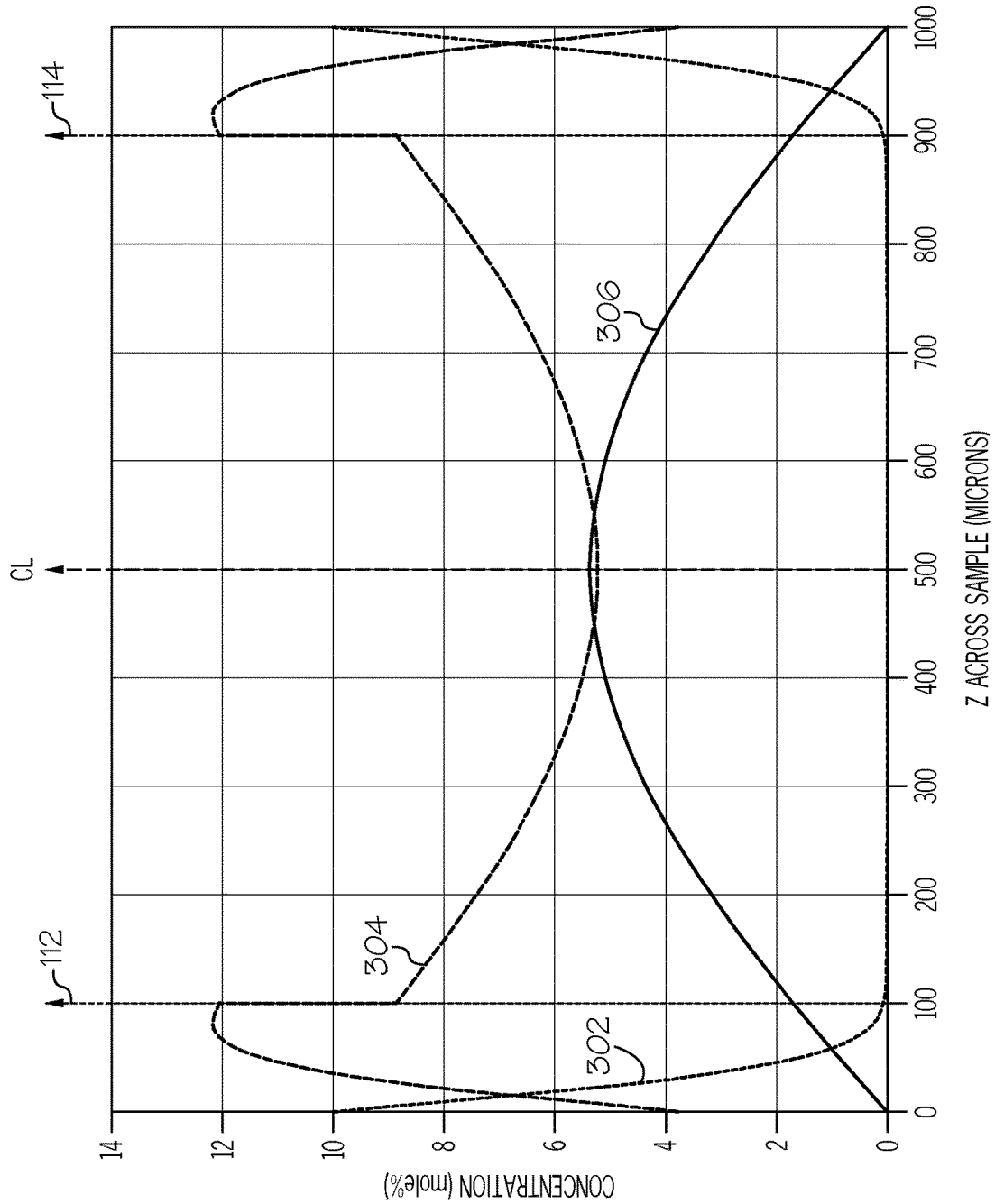
FIG. 3 is a plot of ion concentration of an example embodiment in which concentration is plotted on the y-axis and depth within the glass article is plotted on the x-axis.

However, after ion exchange, the concentration of the alkali oxides, such as $K_2O$, varies in both the core layer 102 and the cladding layers 104, 106 as a function of depth from the surfaces 108, 110 of the glass article 100, as shown in FIG. 3. Specifically, a concentration of $K_2O$ 302 decreases from the surfaces 108, 110 of the glass article 100, through the cladding layers 104, 106, to a cladding side of the interfaces 112, 114. That is, the concentration of $K_2O$ 302 in the cladding layers 104, 106 as a function of distance from the surfaces 108, 110 has a negative slope. Similarly, the concentration of $K_2O$ 302 decreases from a core side of the interface in the direction of the centerline CL of the core layer 102.

Additionally, the concentration of $Na_2O$ 304 increases from the surfaces 108, 110 of the glass article 100, through the cladding layers 104, 106 to a cladding side of the interfaces 112, 114. That is, a concentration of $Na_2O$ 304 in the cladding layers 104, 106 as a function of distance from the surfaces 108, 110 has a positive slope. The $Na_2O$ concentration 304 then changes as a step change at the interface between the cladding layers 104, 106 and the core layer 102, and then continuously decreases within the core layer 102.

Moreover, in FIG. 3, the $Li_2O$ concentration 306 increases with increasing distance from the surface of the cladding layers 104, 106 to a centerline CL in the core layer 102 from a surface concentration of zero to a maximum $Li_2O$ concentration 306 at the centerline.

While the concentration of alkali oxides in the cladding layers 104, 106 changes as a result of ion exchange strengthening, it should be understood that the concentrations of the other constituents of the glass network (i.e., glass formers, intermediates, and non-mobile modifiers such as alkaline earth oxides (CaO, MgO, etc.)) remain substantially the same (i.e., substantially uniform through the thicknesses of the cladding layers 104, 106 and substantially uniform through the thickness of the core layer 102).

Figure 4:
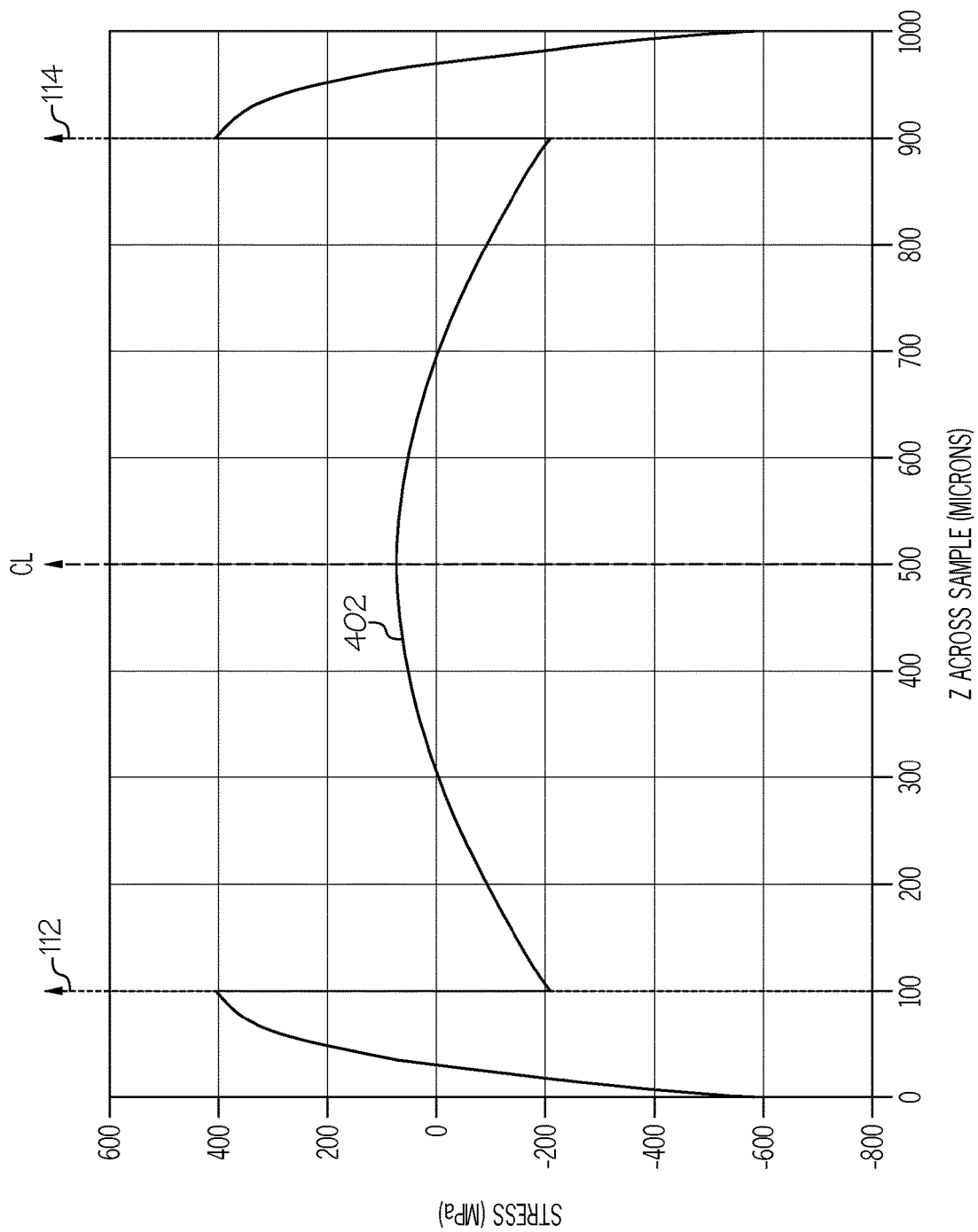
FIG. 4 is a plot of the stress profile of the example embodiment corresponding to the plot of FIG. 3 in which stress is plotted on the y-axis and depth within the glass article is plotted on the x-axis.

The ion exchange treatment also creates a unique stress profile, one example of which is graphically depicted in FIG. 4. As shown in FIG. 4, the glass cladding layer has a stress profile due to ion exchange. The stress in the region from the surface of the glass up to the core-clad interface at 100 μm includes compressive stresses and tensile stresses due to ion exchange strengthening. The core layer 102 (i.e., the portion of the laminate at depths greater than 100 μm) also includes regions that are compressively stressed and regions that are under tensile stress due to ion exchange strengthening the cladding layer through the core layer 102. In the example shown in FIG. 4, the stress profile 402 corresponds to a profile for glass chemically strengthened using a dual ion exchange treatment as described herein.

More particularly, in FIG. 4, the stress of the cladding layer increases with increasing distance from an outer surface of the cladding layer from a compressive stress to a tensile stress, and then transitions to a compressive stress as a step-change at an interface region between the core layer 102 and the cladding layer. The stress of the core layer 102 increases with an increasing distance from the interface region to a center of the core layer 102 from the compressive stress to a tensile stress.

The alkali concentration profile of FIG. 3 and the stress profile of FIG. 4 were obtained using lithium-containing cladding layers 104, 106 and a sodium-containing core layer 102. FIGS. 5-8 each show an alkali concentration profile (FIGS. 5 and 7) or a stress profile (FIGS. 6 and 8) of a glass laminate including a lithium-containing core layer 102 and sodium-containing cladding layers 104, 106. The profiles in FIGS. 5 and 6 were obtained using a cladding layer thickness of 70 μm, while the profiles in FIGS. 7 and 8 were obtained using a cladding layer thickness of 25 μm.

Figure 5:
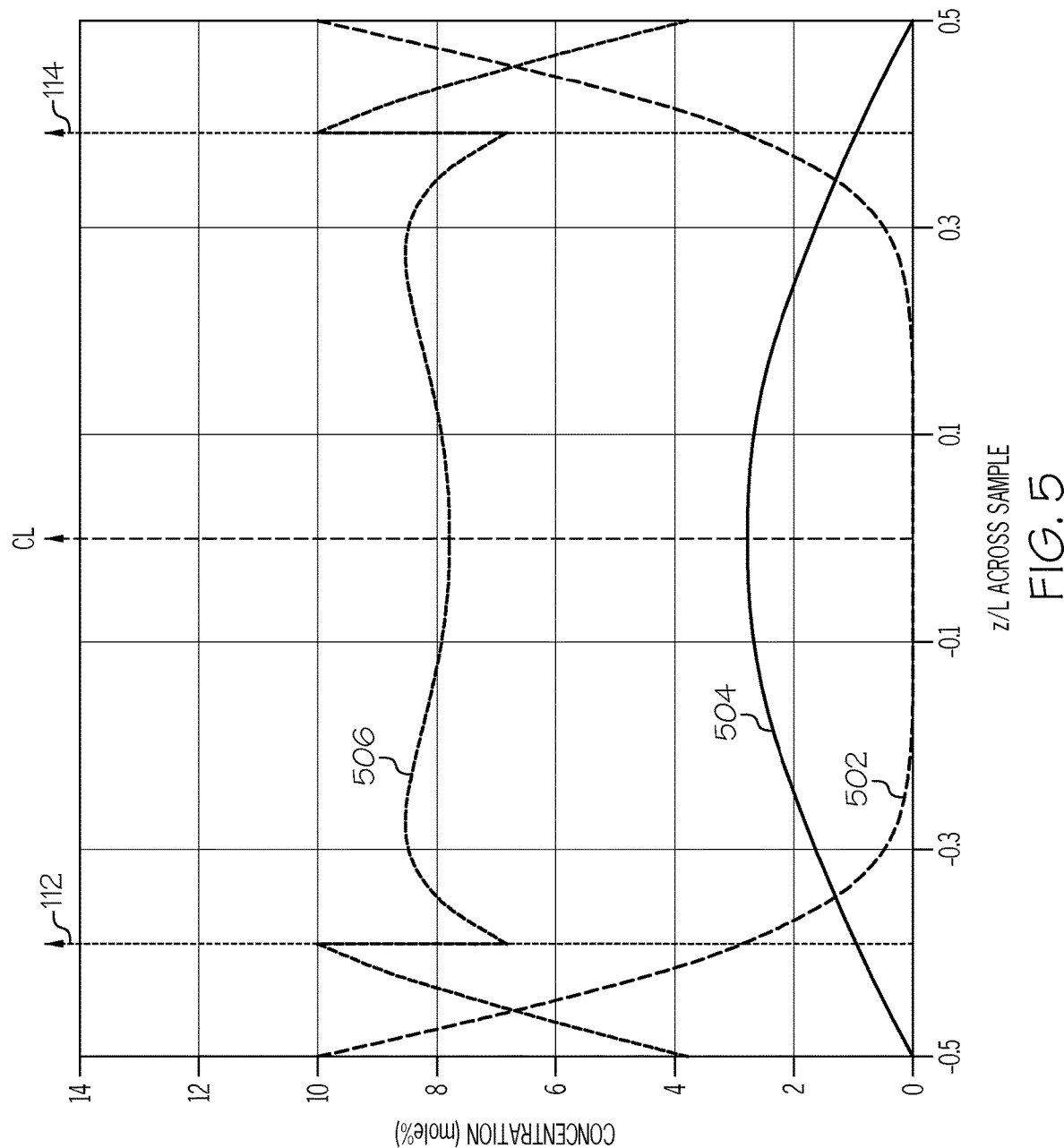
FIG. 5 is a plot of ion concentration of another example embodiment in which concentration is plotted on the y-axis and depth within the glass article is plotted on the x-axis.
Figure 7:
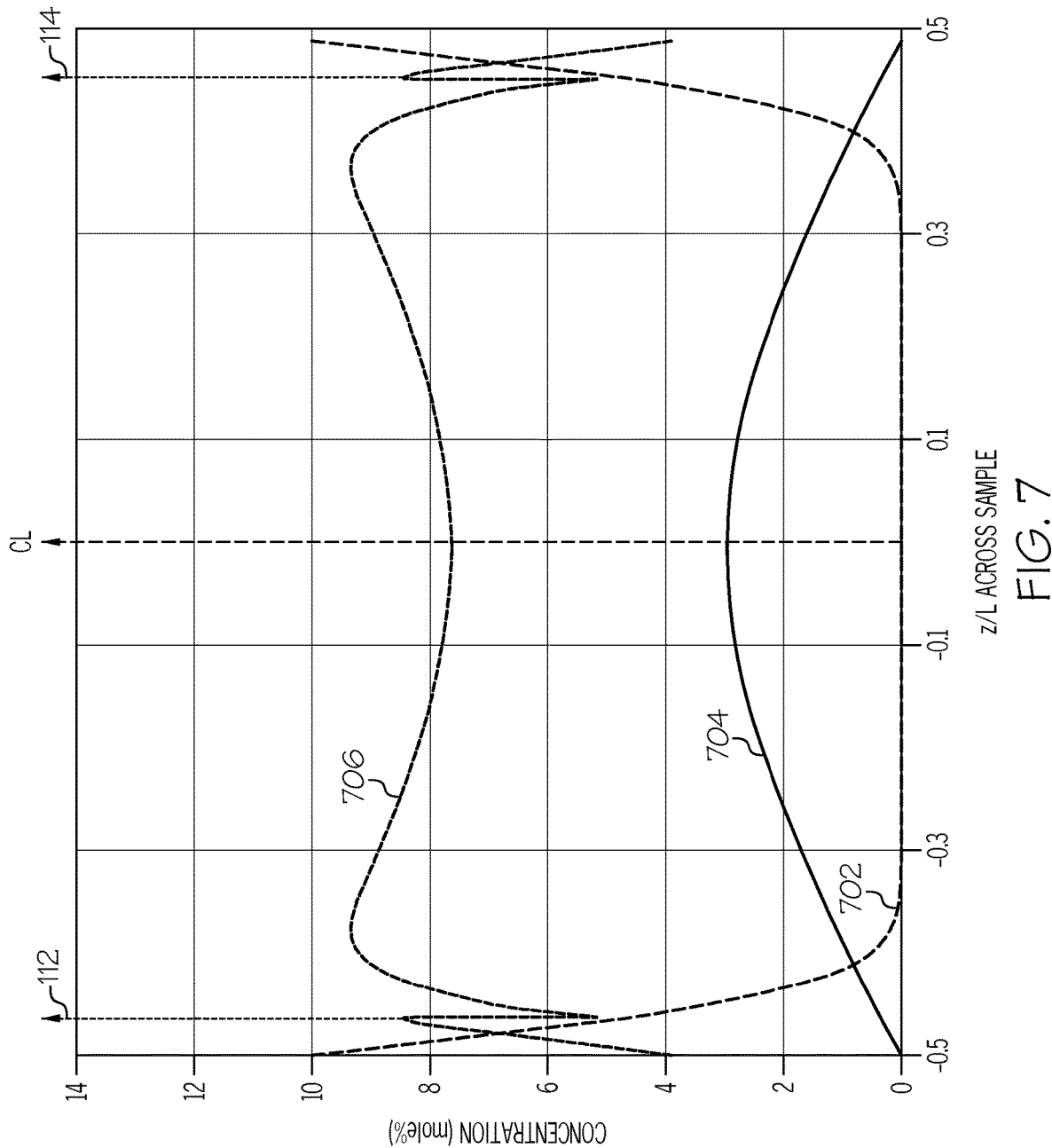
FIG. 7 is a plot of ion concentration of another example embodiment in which concentration is plotted on the y-axis and depth within the glass article is plotted on the x-axis.

As with the previous example, following ion exchange, the concentration of the alkali oxides, such as $K_2O$, varies in both the core layer 102 and the cladding layers 104, 106 as a function of depth from the surfaces 108, 110 of the glass article 100, as shown in FIGS. 5 and 7. Specifically, a concentration of $K_2O$ 502, 702 decreases from the surfaces 108, 110 of the glass article 100, through the cladding layers 104, 106, to a cladding side of the interfaces 112, 114. That is, the concentration of $K_2O$ 502, 702 in the cladding layers 104, 106 as a function of distance from the surfaces 108, 110 has a negative slope. Similarly, the concentration of $K_2O$ 502, 702 decreases from a core side of the interface in the direction of the centerline CL of the core layer 102.

Additionally, in FIGS. 5 and 7, the $Li_2O$ concentration 504, 704 increases with increasing distance from the surface of the cladding layers 104, 106 to a centerline in the core layer 102 from a surface concentration of 0 to a maximum $Li_2O$ concentration 504, 704 at the centerline CL.

However, in FIGS. 5 and 7, the concentration of $Na_2O$ 506, 706 increases from the surfaces 108, 110 of the glass article 100, through the cladding layers 104, 106 to a cladding side of the interfaces 112, 114. That is, a concentration of $Na_2O$ 506, 706 in the cladding layers 104, 106 as a function of distance from the surfaces 108, 110 has a positive slope. The $Na_2O$ concentration 506, 706 then changes as a step change at the interface between the cladding layers 104, 106 and the core layer 102, where it initially increases and then decreases within the core layer 102.

While the concentration of alkali oxides in the cladding layers 104, 106 changes as a result of ion exchange strengthening, it should be understood that the concentrations of the other constituents of the glass network (i.e., glass formers, intermediates, and non-mobile modifiers such as alkaline earth oxides (CaO, MgO, etc.)) remain substantially the same (i.e., substantially uniform through the thicknesses of the cladding layers 104, 106 and substantially uniform through the thickness of the core layer 102).

Figure 6:
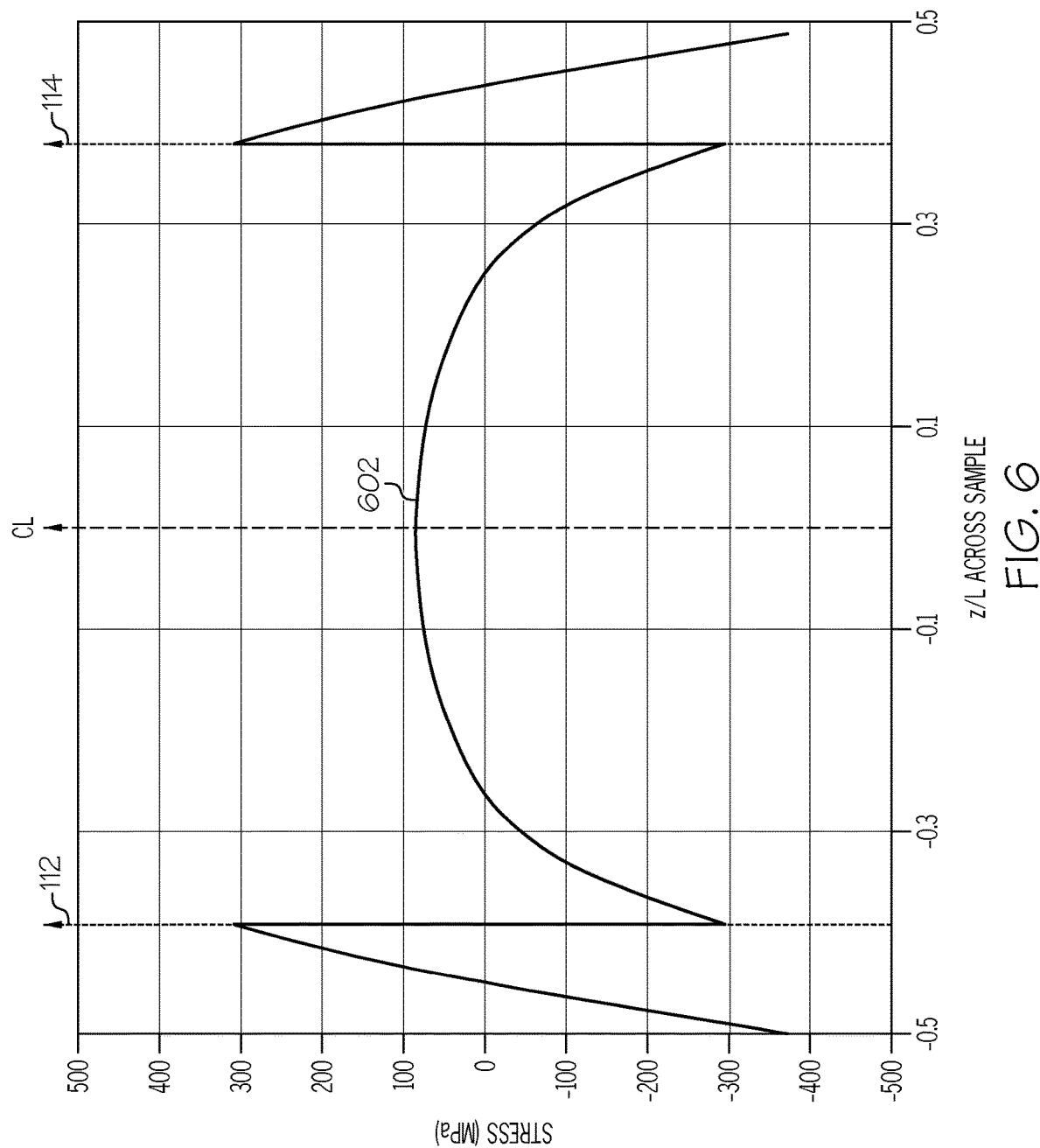
FIG. 6 is a plot of the stress profile of the example embodiment corresponding to the plot of FIG. 5 in which stress is plotted on the y-axis and depth within the glass article is plotted on the x-axis.
Figure 8:
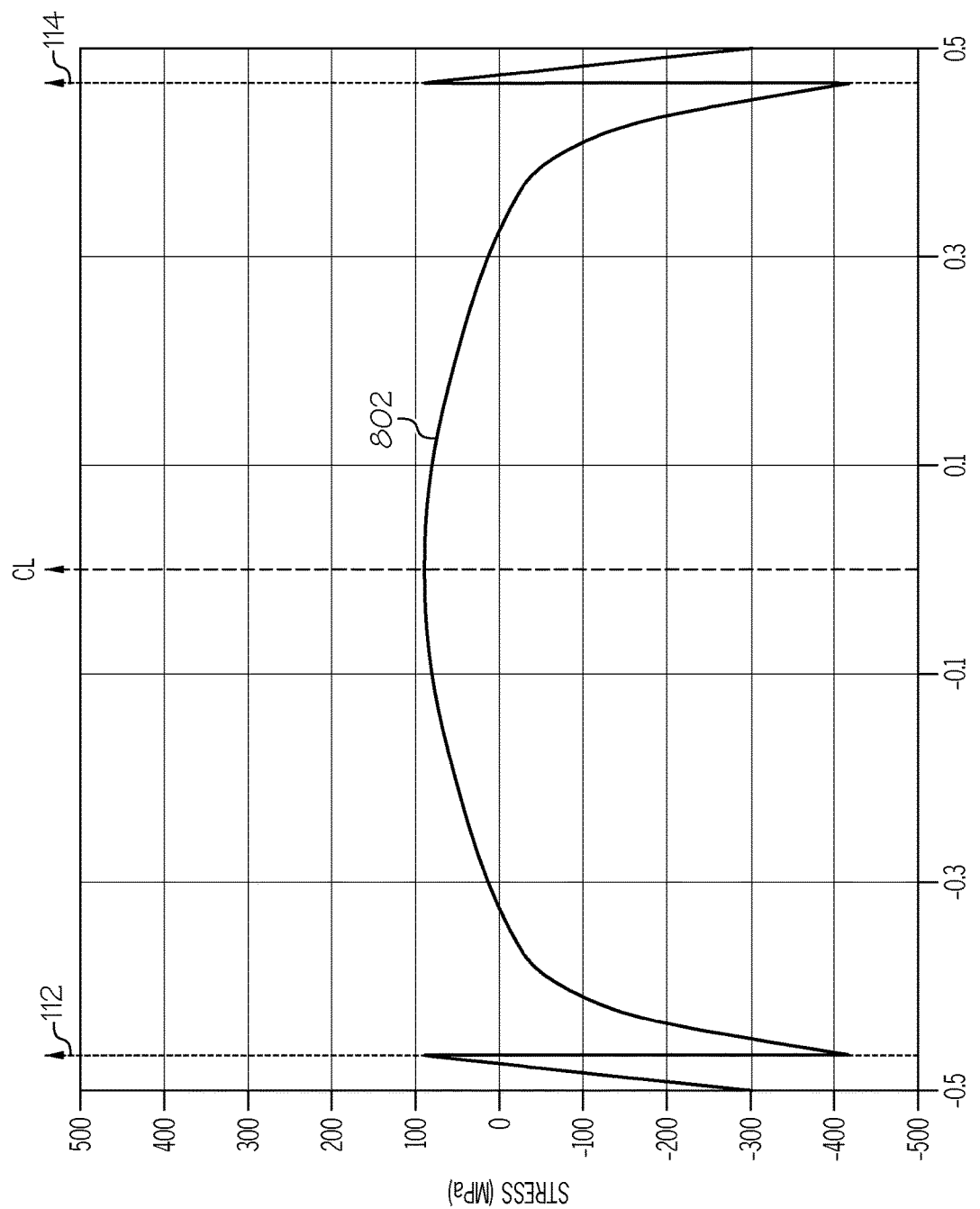
FIG. 8 is a plot of the stress profile of the example embodiment corresponding to the plot of FIG. 7 in which stress is plotted on the y-axis and depth within the glass article is plotted on the x-axis.

In the stress profiles depicted in FIGS. 6 and 8, the cladding layers 104, 106 have profiles due to ion exchange. In FIG. 6, the stress in the region from the surface of the glass up to the core-cladding interface at 70 μm includes compressive stresses and tensile stresses due to ion exchange strengthening. The core layer 102 (i.e., the portion of the laminate at depths greater than 70 μm) also includes regions that are compressively stressed and regions that are under tensile stress due to ion exchange strengthening the core layer 102 through the cladding layers 104, 106. In the example shown in FIG. 6, the stress profile 602 corresponds to a profile for glass chemically strengthened using a dual ion exchange treatment as described herein.

More particularly, in FIG. 6, the stress of the cladding layer increases with increasing distance from an outer surface of the cladding layer from a compressive stress to a tensile stress, and then transitions to a compressive stress as a step-change at an interface region between the core layer 102 and the cladding layer. The stress of the core layer 102 increases with an increasing distance from the interface region to a center of the core layer 102 from the compressive stress to a tensile stress.

However, in FIG. 8, the stress profile 802 indicates that the stress in the region from the surface of the glass up to the core-cladding interface at 25 μm includes only compressive stresses due to ion exchange strengthening. The core layer 102 (i.e., the portion of the laminate at depths greater than 25 μm) includes regions that are compressively stressed and regions that are under tensile stress due to ion exchange strengthening the core layer 102 through the cladding layers 104, 106.

More particularly, in FIG. 8, the stress of the cladding layer increases with increasing distance from an outer surface of the cladding layer from an initial compressive stress to a minimum compressive stress, and then transitions to a maximum compressive stress as a step-change at an interface region between the core layer 102 and the cladding layer. The stress of the core layer 102 increases with an increasing distance from the interface region to a center of the core layer 102 from the compressive stress to a tensile stress.

Notably, the reduction in the cladding layer thickness eliminates the tensile stress in the cladding layer, reduces the central tension in the glass article, and maintains a depth of compression (DOC) of about 100 μm, or about 21% of the total thickness of the glass laminate. In other words, high levels of compression can be generated without generating significant tension within the core layer 102.

The retained strength of a glass article can be determined based on the stress profile of the glass article. For example, the retained strength is determined by forming a flaw extending from a surface of the glass article to a specified depth and then determining the strength of the glass article after formation of the flaw. The strength is flexural strength of the glass article determined using, for example, a ring-on-ring test method (e.g., as described in ASTM C1499-09), a ball-on-ring test method, a three-point bend test method, a four-point bend test method, or another suitable method or technique. Such a retained strength determination can be conducted using a fracture mechanics simulation based on the stress profile of the glass article.

Moreover, the improved resistance to breakage resulting from large flaws can be achieved by the strength profile 802 while decreasing the maximum tensile stress of the tensile region as compared to the retained strength profile 602 and/or the retained strength profile 402. For example, maintaining the compressive stress at a relatively constant level relatively deep into the compressive region (e.g., over the intermediate portion) can help to maintain the area under the compressive portion of the stress profile curve, which is proportional to the maximum tensile stress in the tensile region, relatively low while also providing protection against breakage caused by relatively deep flaws. Thus, the maximum tensile stress can be maintained below the frangibility limit.

Figure 9:
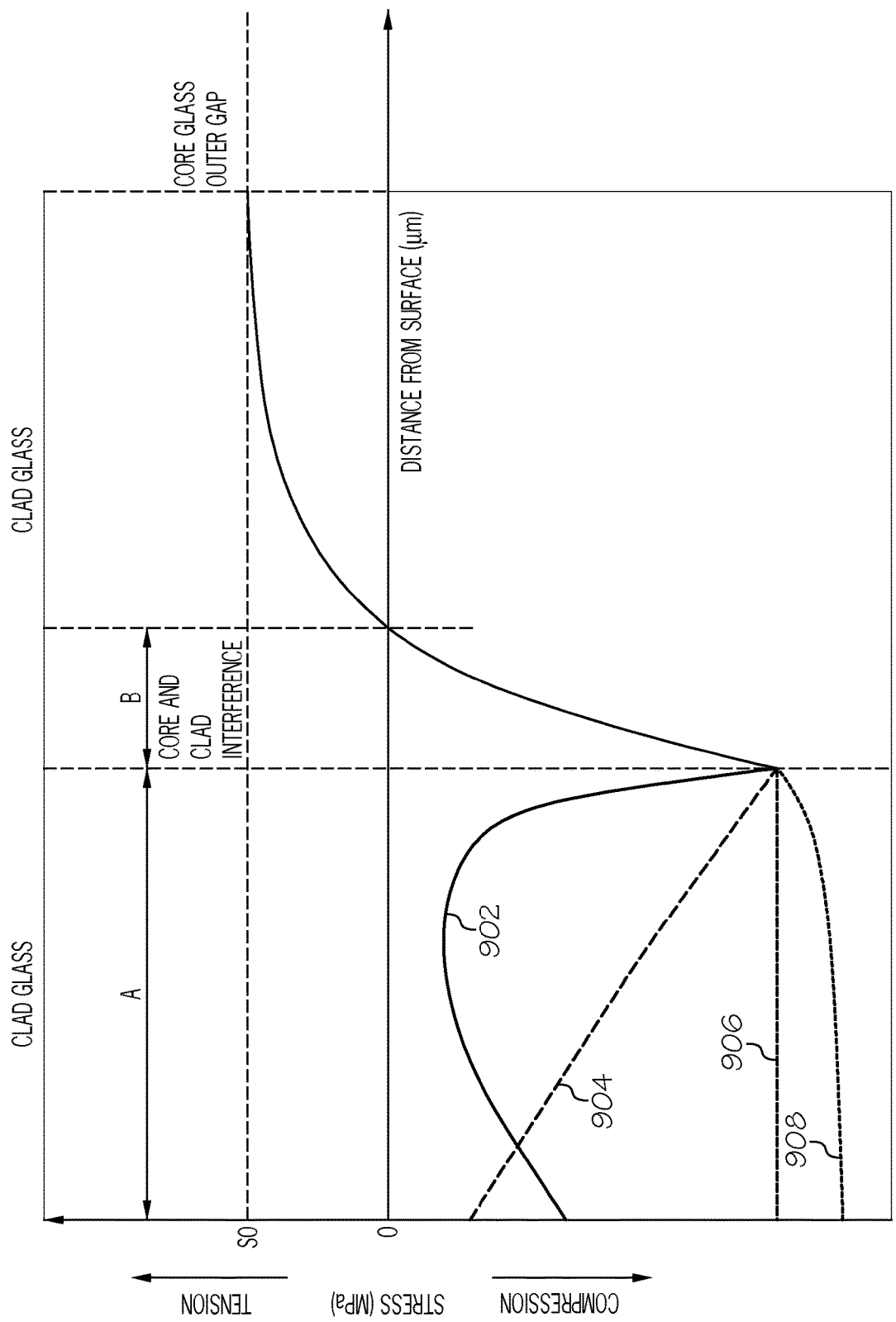
FIG. 9 is a plot of stress profiles of example embodiments in which stress is plotted on the y-axis and depth within the glass article is plotted on the x-axis.

In various embodiments, the ion exchange parameters and glass compositions selected for each of the cladding layers 104, 106 and the core layer 102 can be selected to achieve a particular stress profile. Various example stress profiles are depicted in FIG. 9.

For example, stress profile 902 can be obtained where the stress gradient in the deeper portion of the cladding layer is not continuous. Rather, the stress in the cladding layer monotonically changes from the surface to the clad-core interface, whereupon it jumps to compression within the core layer 102. Alternatively, the stress may have a gradient across the clad-core interface, taking into account that an inter-diffusion layer exists between the cladding layer and the core layer 102, in which the composition gradually changes from the clad glass composition to the core glass composition. In one particular embodiment, the stress profile 902 can be achieved by using a core glass composition that has a much higher alkali content than the clad glass composition.

For example, in one particular embodiment, the clad glass composition includes 6 mol % $Na_2O$ and 1 mol % $K_2O$ as the alkali, and the core glass composition includes 18 mol % $Na_2O$ and 3 mol % $K_2O$. After ion exchanging the sample as a first step in a bath having 50% $NaNO_3$ and 50% $KNO_3$ for a first exchange time of, for example and without limitation, from greater than or equal to 1 hour to less than or equal to 100 hours, there is substantial penetration of K ions into the core glass B. Then, in a second step, the sample is ion exchanged in a bath having 100% $KNO_3$, for a second exchange time that is less than the first exchange time that is adequate for the K ions to produce a gradient profile within the cladding layer. The second exchange time may be, for example and without limitation, from about 10 minutes to less than or equal to 5 hours so long as the second exchange time is less than the first exchange time.

As another example, the stress profile 904 can be obtained after a first long ion exchange step (e.g., after an ion exchange time of, for example and without limitation, from greater than or equal to 1 hour to less than or equal to 100 hours), but the second step is an ion exchange step with non-permeable boundary conditions in which only ions already in the glass diffuse between the core layer and the cladding layer, but no additional ions are diffused into the glass article from an external source (e.g., a molten salt bath). The second ion exchange step may be performed, for example and without limitation, by heating the glass article to a temperature sufficient for ion exchange (e.g., from about 350° C. to about 550° C.). This increases the ion exchange between the core layer and the cladding layer(s) and results in increased compressive stress at the interface between the core layer and the cladding layer(s). However, due to force balancing, the compressive stress at or near the surface of the cladding layer decreases. As a result, the stress profile 904 in the cladding layer is substantially linear. In such embodiments, the second derivative of the stress profile can be neglected for purposes of distinguishing the mechanical performance.

In still another example, the stress profile 906 can be obtained by using a clad glass composition with a much higher alkali diffusivity than the core glass composition, so the stress gradient in the cladding layer(s) is substantially eliminated. In this embodiment, the stress gradient in the cladding layer(s) is sufficiently reduced that it is irrelevant for purposes of distinguishing the mechanical performance. The glass laminate is subjected to a first, long ion exchange (e.g., an ion exchange time of, for example and without limitation, from greater than or equal to 1 hour to less than or equal to 100 hours), so that the stress profile penetrates all the way to the core layer 102, followed by a heat treatment to produce the flat region near the surface of the cladding layer.

The stress profile 908 can be obtained by using a clad glass composition with a much higher diffusivity than the core glass composition (but a lower diffusivity than the clad glass composition used to obtain the stress profile 906) in conjunction with a long ion exchange as a first step, so the stress profile penetrates all the way to the core layer 102, followed by a heat treatment to produce the flat region of the stress profile near the surface of the cladding layer.

Figure 10:
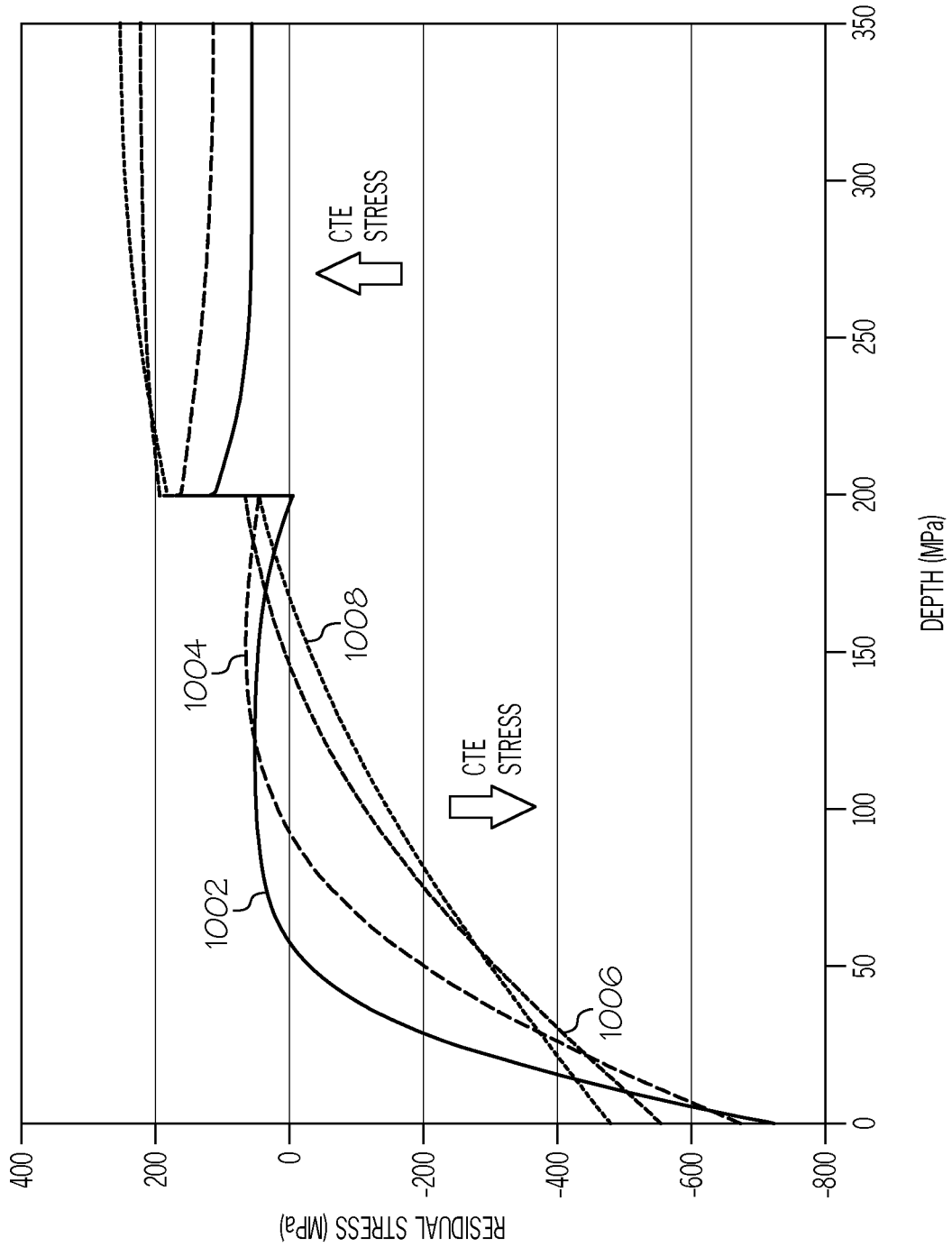
FIG. 10 is a plot of stress profiles of example embodiments in which stress is plotted on the y-axis and depth within the glass article is plotted on the x-axis.

In various embodiments, enabling ion exchange along the clad-core interface can also result in various stress profiles. For example, as shown in FIG. 10, the amount of time that a sample is subjected to an ion exchange process can change the resultant stress profile. In FIG. 10, glass laminates having a sodium rich clad glass composition and a potassium rich core glass composition were ion exchanged for various amounts of time. In particular, stress profile 1002 was obtained following an ion exchange step of a first duration D1 (hours), stress profile 1004 was obtained following an ion exchange step of approximately 4×D1, stress profile 1006 was obtained following an ion exchange step of approximately 15×D1, and stress profile 1008 was obtained following an ion exchange step of 25×D1. Although the stresses from the CTE mismatch between the cladding layer and the core layer 102 are not included in the stress profiles depicted in FIG. 10, the CTE stresses would shift the stresses within the cladding layer in the −Y direction while the CTE stresses would shift the stresses within the core layer 102 in the +Y direction. Accordingly, with this particular combination of alkalis in the core and clad glass compositions, a thicker cladding layer can be employed without introducing tensile stress to the cladding layer.

Figure 11:
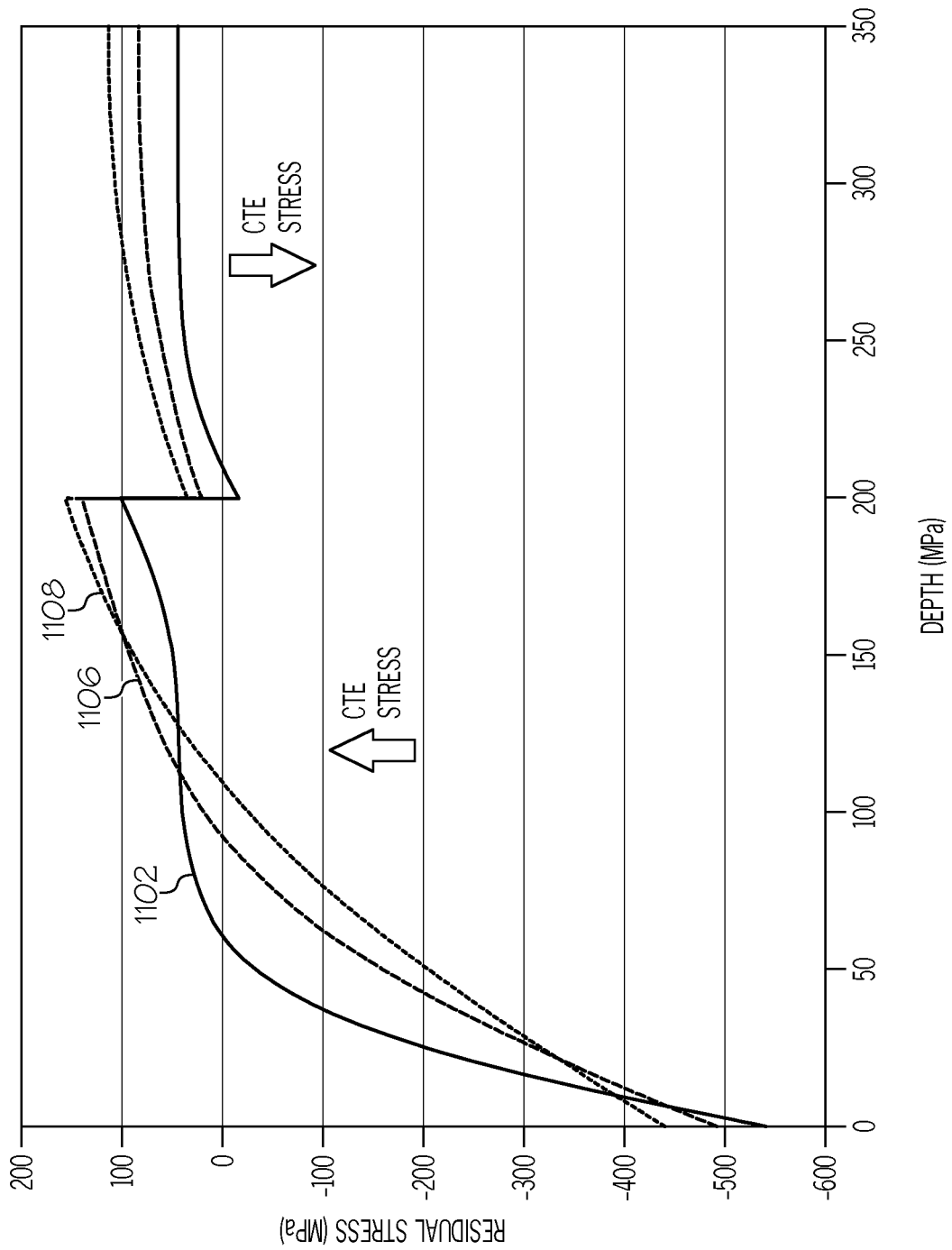
FIG. 11 is a plot of stress profiles of example embodiments in which stress is plotted on the y-axis and depth within the glass article is plotted on the x-axis

Still other stress profiles can be obtained by reversing the alkali content of the cladding layer and core layer 102. For example, as shown in FIG. 11, glass laminates having a potassium rich clad glass composition and a sodium rich core glass composition were ion exchanged for various amounts of time. In particular, stress profile 1102 was obtained following an ion exchange step of a first duration D1 (hours), stress profile 1104 was obtained following an ion exchange step of approximately 4×D1, stress profile 1106 was obtained following an ion exchange step of approximately 15×D1, and stress profile 1108 was obtained following an ion exchange step of approximately 25×D1. Although the stresses from the CTE mismatch between the cladding layer and the core layer 102 are not included in the stress profiles depicted in FIG. 11, the CTE stresses would shift the stresses within the cladding layer in the +Y direction while the CTE stresses would shift the stresses within the core layer 102 in the −Y direction. Accordingly, with this particular combination of alkalis in the core and clad glass compositions, a thicker cladding layer can be employed to reduce the central tension within the glass laminate. Moreover, the combination of glass compositions along with the CTE mismatch can result in compressive stresses in the core layer 102.

Figure 12:
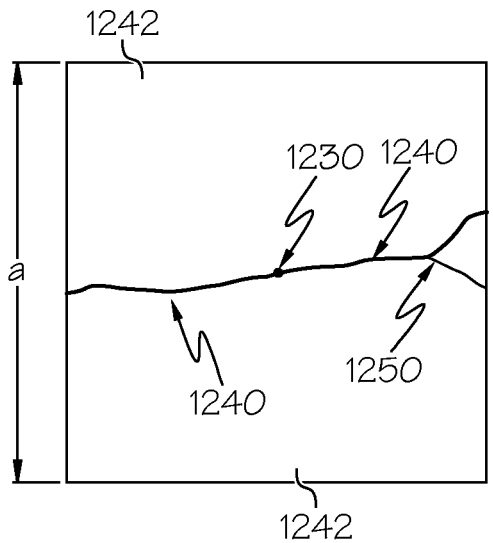
FIG. 12 is a representation of a non-frangible sample after a frangibility test.

Various embodiments described herein can also be used to reduce the frangibility of a glass laminate. In some embodiments, the glass articles disclosed herein are not frangible upon being ion-exchanged. Frangible behavior refers to specific fracture behavior when a glass article is subjected to an impact or insult. As utilized herein, a glass is considered non-frangible when it exhibits at least one of the following in a test area as the result of a frangibility test: (1) four or less fragments with a largest dimension of at least 1 mm, and/or (2) the number of bifurcations is less than or equal to the number of crack branches. The fragments, bifurcations, and crack branches are counted based on any 2 inch by 2 inch square centered on the impact point. Thus, a glass is considered non-frangible if it meets one or both of tests (1) and (2) for any 2 inch by 2 inch square centered on the impact point where the breakage is created according to the procedure described below. In a frangibility test, an impact probe is brought in to contact with the glass, with the depth to which the impact probe extends into the glass increasing in successive contact iterations. The step-wise increase in depth of the impact probe allows the flaw produced by the impact probe to reach the tension region while preventing the application of excessive external force that would prevent the accurate determination of the frangible behavior of the glass. In one embodiment, the depth of the impact probe in the glass may increase by about 5 μm in each iteration, with the impact probe being removed from contact with the glass between each iteration. The test area is any 2 inch by 2 inch square centered at the impact point. FIG. 12 depicts a non-frangible test result. As shown in FIG. 12, the test area is a square that is centered at the impact point 1230, where the length of a side of the square a is 2 inches. The non-frangible sample shown in FIG. 12 includes three fragments 1242, and two crack branches 1240 and a single bifurcation 1250. Thus, the non-frangible sample shown in FIG. 12 contains less than 4 fragments having a largest dimension of at least 1 mm and the number of bifurcations is less than or equal to the number of crack branches. As utilized herein, a crack branch originates at the impact point, and a fragment is considered to be within the test area if any part of the fragment extends into the test area. While coatings, adhesive layers, and the like may be used in conjunction with the strengthened glass articles described herein, such external restraints are not used in determining the frangibility or frangible behavior of the glass articles. In some embodiments, a film that does not affect the fracture behavior of the glass article may be applied to the glass article prior to the frangibility test to prevent the ejection of fragments from the glass article, increasing safety for the person performing the test.

Figure 13:
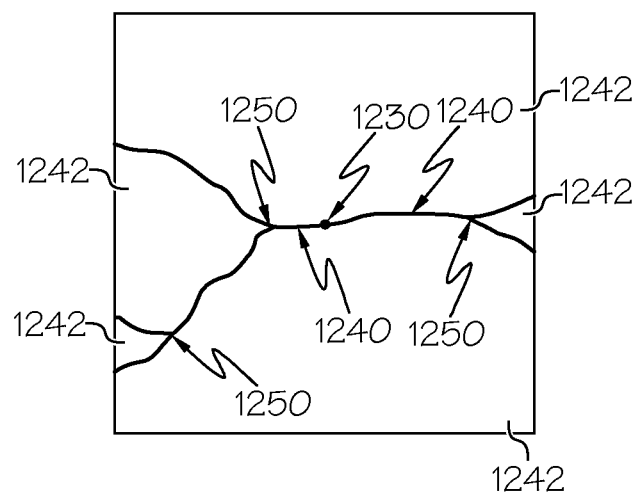
FIG. 13 is a representation of a frangible sample after a frangibility test.

A frangible sample is depicted in FIG. 13. The frangible sample includes 5 fragments 1242 having a largest dimension of at least 1 mm. The sample depicted in FIG. 13 includes 2 crack branches 1240 and 3 bifurcations 1250, producing more bifurcations than crack branches. Thus, the sample depicted in FIG. 13 does not exhibit either four or less fragments or the number of bifurcations being less than or equal to the number of crack branches.

In the frangibility test described herein, the impact is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., depth of compression) into the region that is under central tension CT.

Accordingly, the chemically strengthened glasses described herein are "non-frangible"—i.e., they do not exhibit frangible behavior as described hereinabove when subjected to impact by a sharp object.

Figure 14:
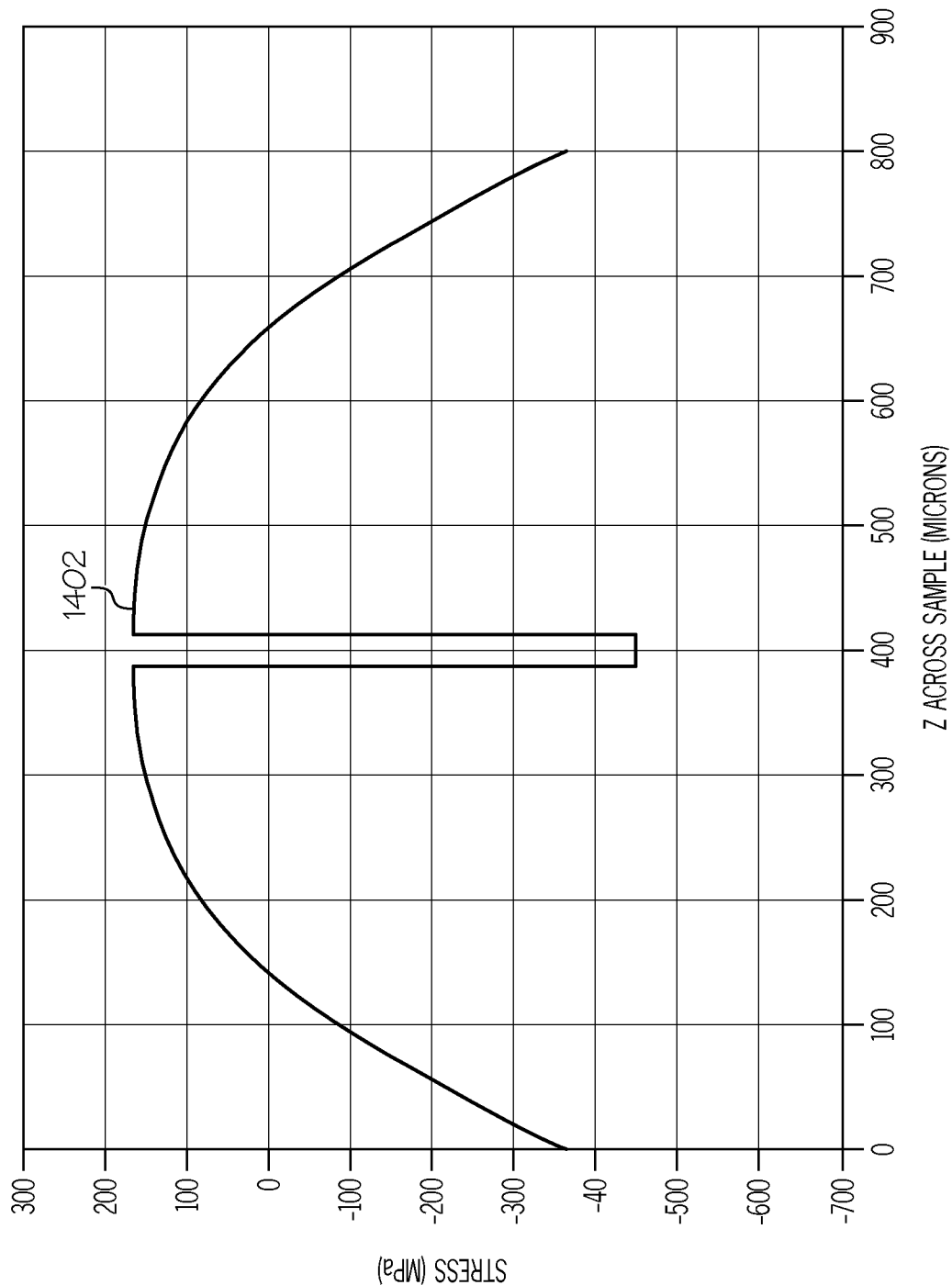
FIG. 14 is a plot of stress profiles of another example embodiment in which stress is plotted on the y-axis and depth within the glass article is plotted on the x-axis.

Frangibility of the chemically strengthened glasses described herein can be reduced by burying a compressive stress peak within the core layer 102. For example, a glass article having a thin core layer 102 that is low in potassium concentration and thick cladding layers 104, 106 that include potassium ions can have a stress profile 1402, as shown in FIG. 14. When the glass article is subjected to an ion exchange treatment, the potassium ions from the cladding layer exchange into the core layer 102, increasing the compression within the core layer 102. Without being bound by theory, it is believed that the thinner the core layer 102 and the stronger the CTE mismatch, the higher the compressive stress barrier can be built into the glass. This compression reduces frangibility by dividing the tensile region, and arrests cracks.

Figure 15:
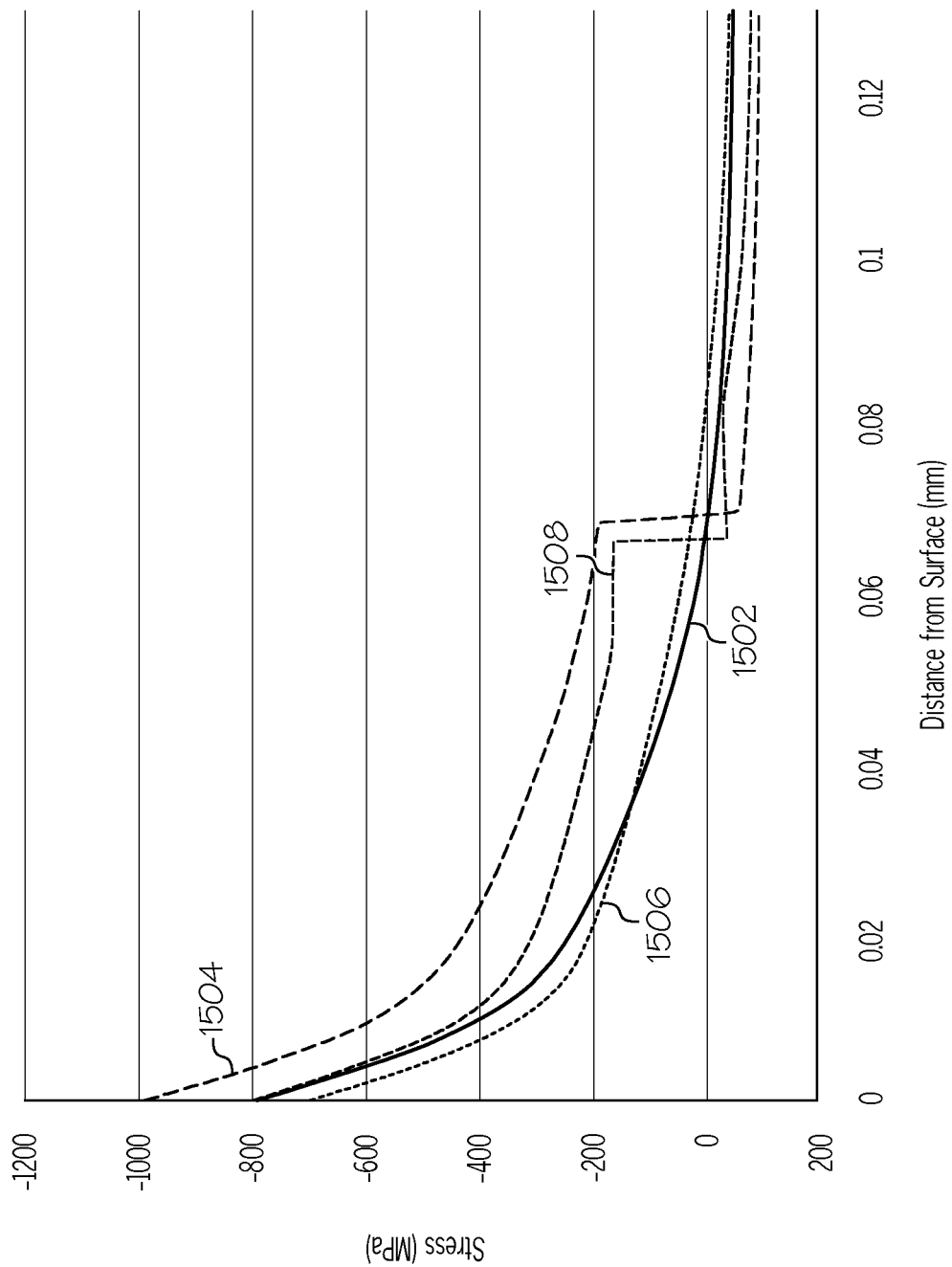
FIG. 15 is a plot of stress profiles of example embodiments in which stress is plotted on the y-axis and depth within the glass article is plotted on the x-axis.

As described hereinabove, in various embodiments, the glass article is mechanically strengthened through a CTE mismatch between the core layer 102 and the cladding layers 104, 106. FIG. 15 depicts various stress profiles accounting for the dual ion exchange process described herein and the CTE difference.

In FIG. 15, stress profiles 1502 and 1506 correspond to glass articles that were subjected to a dual ion exchange process as described herein, but are not laminated. Stress profiles 1504 and 1508 correspond to laminated glass articles that were subjected to the same dual ion exchange processes that generated stress profiles 1502 and 1506, respectively. The glass article corresponding to stress profile 1508 has a lower laminate CTE difference, a lower peak compressive stress, and a deeper depth of compression for the ion exchange and the step profile as compared to the glass article corresponding to stress profile 1504. As shown in FIG. 15, the stress profiles 1504 and 1508 for the mechanically and chemically strengthened glass articles provide good protection against both short and deep flaws, and the addition of the laminate, and particularly the constant stress profile region, enables higher stress at the depth of compression instead of the error function decay that results in a region of low stress before the depth of compression. Additionally, the dual ion exchange enables the stress profile to have a non-constant stress as a function of depth.

Figure 16:
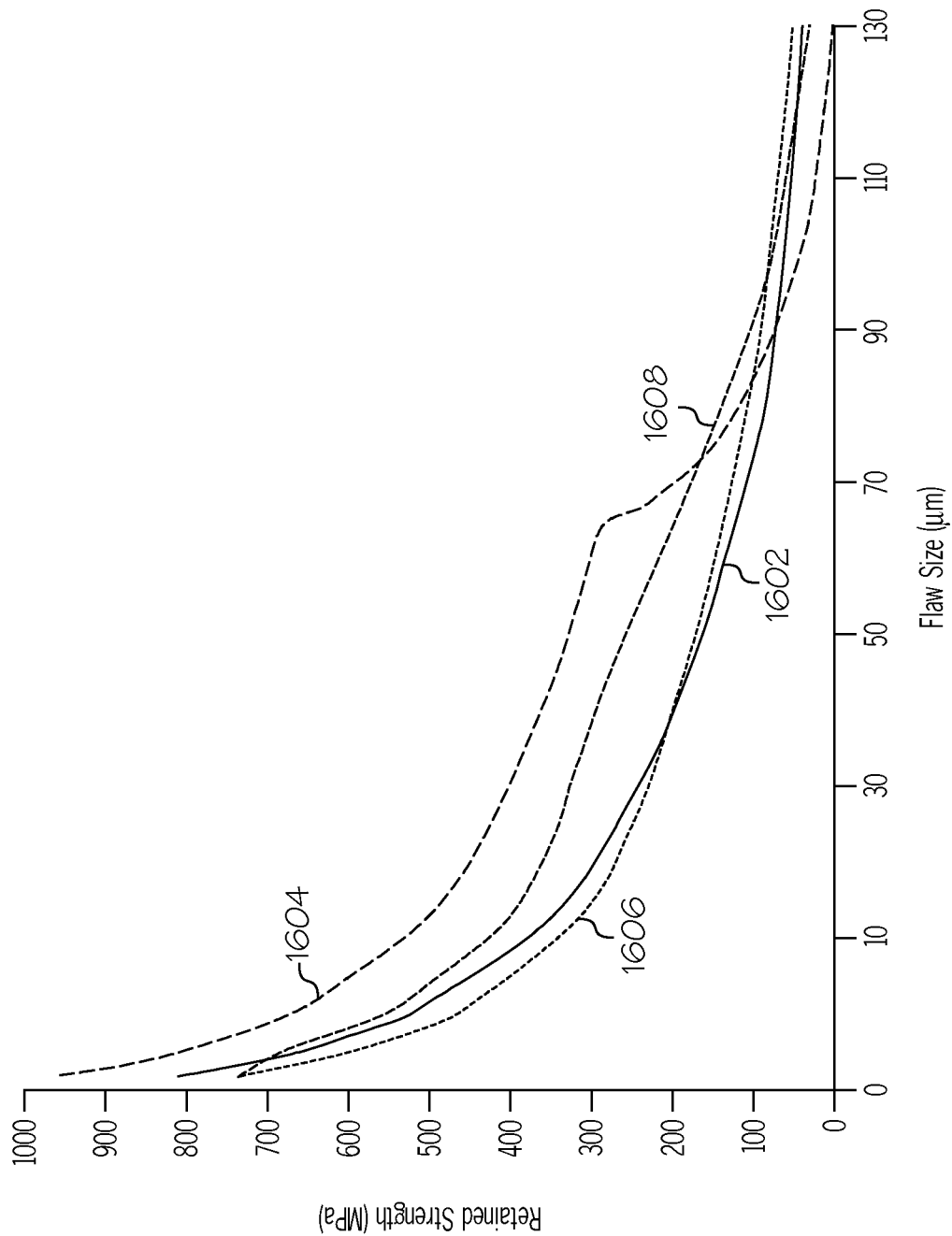
FIG. 16 is a plot of retained strength profiles of example embodiments in which retained strength is plotted on the y-axis and flaw size is plotted on the x-axis.

FIG. 16 illustrates the calculated retained strength based on fracture mechanics as a function of flaw size for the glass articles corresponding to the stress profiles in FIG. 15. In particular, retained strength profile 1602 corresponds to stress profile 1502, retained strength profile 1604 corresponds to stress profile 1504, retained strength profile 1606 corresponds to stress profile 1506, and retained strength profile 1608 corresponds to stress profile 1508. In FIG. 16, it can be seen that the mechanically and chemically strengthened glass articles (corresponding to strength profiles 1604 and 1608) exhibit greater retained strength for flaw sizes of up to about 90 μm. Additionally, it can be seen that the glass article corresponding to strength profile 1608 has reduced strength for small flaws, but has more strength for deeper flaws when compared to the glass article corresponding to strength profile 1604. Accordingly, the dual ion exchange profile and laminate stresses can be combined to provide a desired retained strength for a given critical flaw size range.

Figure 17:
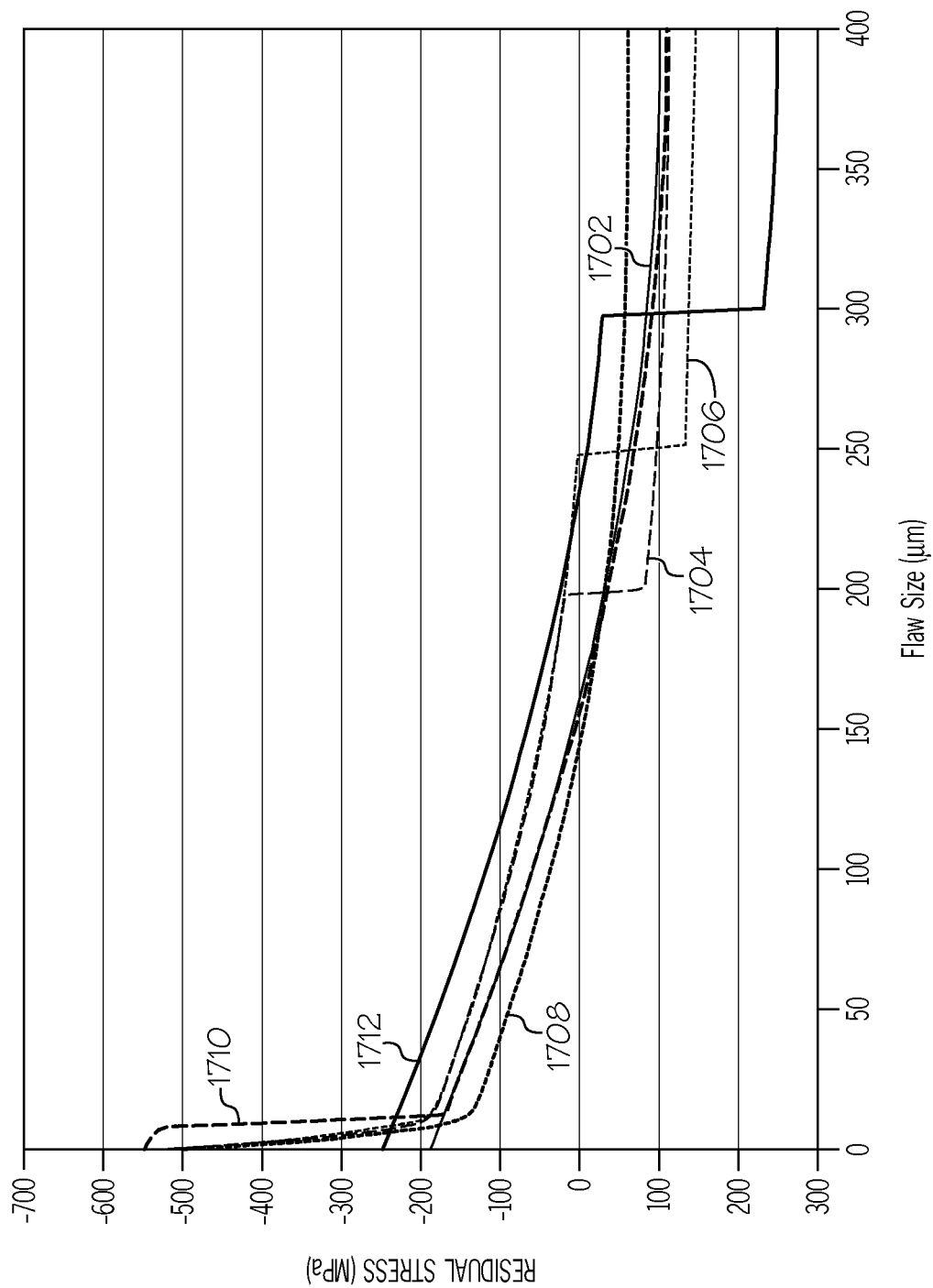
FIG. 17 is a plot of stress profiles of example embodiments in which stress is plotted on the y-axis and depth within the glass article is plotted on the x-axis.

Various additional stress profiles can be obtained in various embodiments described herein are shown in FIG. 17. In particular, the profiles in FIG. 17 illustrate that two general strategies for leveraging the step profile obtained from a glass article having a CTE mismatch, as described herein. First, stress profile 1704 illustrates that a high compressive stress, but low thickness, cladding layers 104, 106 can be used to compensate for low compressive strength in a parabolic stress profile, such as stress profile 1702, 1708, or 1710. This strategy could result in good scratch performance resulting from a high compressive stress and high free volume due to the high fictive temperature of the glass. In particular, high free volume (e.g., low density) may result in improved scratch and/or indentation fracture resistance performance. Second, as can be seen by comparing stress profiles 1704, 1706, and 1712 to stress profiles 1702, 1708, and 1710, a high depth of compression as well as a low slope as the compressive stress transitions to a tensile stress can result in improved drop performance. By mechanically strengthening the glass article, both features can be leveraged by increasing the depth of compression via addition of a low compressive stress step profile, which extends to or beyond the depth of compression of the combined profiles. The compressive stress can be effectively "hidden" in a region where its presence does not affect drop performance.

Figure 18:
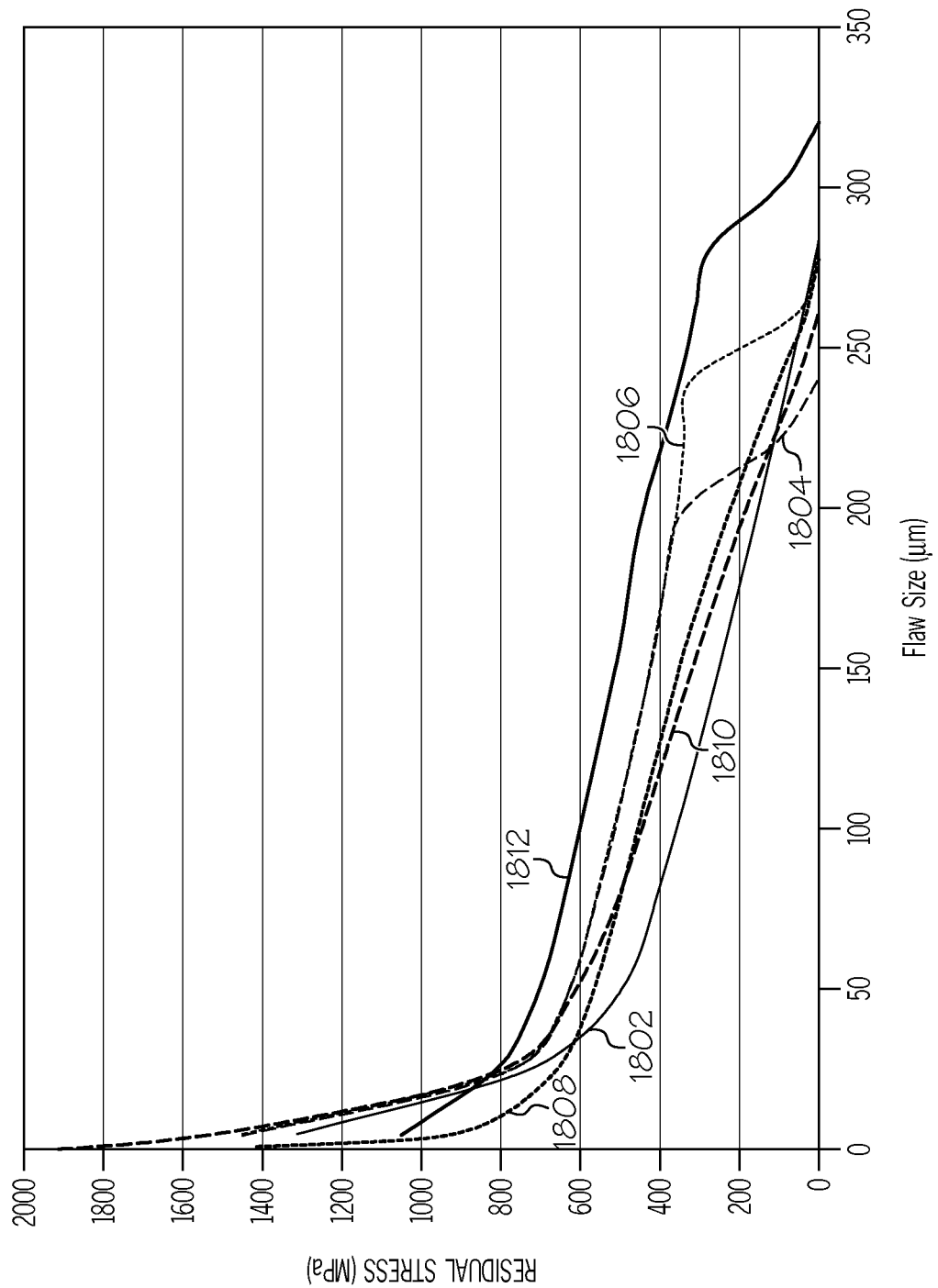
FIG. 18 is a plot of retained strength profiles of the example embodiments corresponding to the stress profiles of FIG. 17 in which retained strength is plotted on the y-axis and flaw size is plotted on the x-axis.

FIG. 18, which illustrates the retained strength of the glass articles corresponding to the stress profiles of FIG. 17, demonstrates that both strategies are effective in leveraging the step profile. In addition, as shown in FIG. 18, the thickness of the cladding layer can be adjusted to provide improved retained strength for any flaw range of interest. The residual strength profiles in FIG. 18 further illustrate that burying the central tension increases the retained strength while the high compressive stress increases the strength for short flaws.

Various embodiments described herein enable improved glass performance, such as scratch and crack resistance, through mechanical and chemical strengthening. Moreover, the selection of various glass compositions to attain particular CTE mismatches between the core layer and cladding layers as well as ion exchange of the core layer through the cladding layers can produce a glass article having a series of compression-tension zones through the thickness of the glass article, which can reduce frangibility and arrest cracks.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A laminated glass article comprising:
    a core layer comprising a core glass composition; and
    a cladding layer directly adjacent to the core layer and comprising a clad glass composition;
    wherein:
        a concentration of Li ions increases with increasing distance from an outer surface of the cladding layer to a centerline of the core layer;
        a concentration of K ions decreases with increasing distance from the outer surface of the cladding layer to an interface between the cladding layer and the core layer; and
        a concentration of Na ions increases with increasing distance from the outer surface of the cladding layer to a maximum concentration of Na ions in the cladding layer or at the interface between the cladding layer and the core layer and transitions to a lower concentration of Na ions relative to the maximum concentration of Na ions via a step change at the interface between the cladding layer and the core layer.

2. The laminated glass article according to claim 1, wherein the concentration of Na ions decreases with increasing distance from the interface between the cladding layer and the core layer to the centerline of the core layer.

3. The laminated glass article according to claim 1, wherein the concentration of Na ions increases and then decreases with increasing distance from the interface between the cladding layer and the core layer to the centerline of the core layer.

4. The laminated glass article according to claim 1, wherein the concentration of Li ions increases according to a non-linear relationship.

5. The laminated glass article according to claim 1, wherein a concentration of K ions in the core layer is zero.

6. The laminated glass article according to claim 1, wherein the concentration of Na ions increases from the outer surface of the cladding layer to the maximum concentration of Na ions according to a linear relationship.

7. The laminated glass article according to claim 1, wherein the concentration of Na ions increases from the outer surface of the cladding layer to the maximum concentration of Na ions according to a non-linear relationship.

8. A laminated glass article comprising:
    a core layer comprising a core glass composition; and
    a cladding layer directly adjacent to the core layer and comprising a clad glass composition;
    wherein a stress of the cladding layer increases with increasing distance from an outer surface of the cladding layer from a first compressive stress to a second compressive stress, transitions to a third compressive stress as a step-change at an interface region between the core layer and the cladding layer, and increases with increasing distance from the interface region to a center of the core layer from the third compressive stress to a tensile stress, and
    wherein the first compressive stress is greater than the second compressive stress and lower than the third compressive stress.

* * * * *